United States Patent [19]

Ito et al.

[11] Patent Number: 5,075,051
[45] Date of Patent: Dec. 24, 1991

[54] MOLDING PROCESS AND APPARATUS FOR TRANSFERRING PLURAL MOLDS TO PLURAL STATIONS

[75] Inventors: Kazuhiko Ito, Tokyo; Eiichi Yamazaki, Ushiku; Kunio Ohtaki; Fumio Korayashi, both of Ryugasaki; Yoshihisa Masuda, Yokohama; Hiroshi Nakanishi; Kiyozo Suzuki, both of Tokyo; Yuichi Miyoshi, Ushiku, all of Japan

[73] Assignee: Cannon Kabushiki Kaisha, Tokyo, Japan

[21] Appl. No.: 385,364

[22] Filed: Jul. 27, 1989

[30] Foreign Application Priority Data

| Jul. 28, 1988 | [JP] | Japan | 63-186701 |
| Jul. 28, 1988 | [JP] | Japan | 63-186702 |
| Jul. 28, 1988 | [JP] | Japan | 63-186703 |
| Jul. 28, 1988 | [JP] | Japan | 63-186704 |
| Jul. 29, 1988 | [JP] | Japan | 63-99858[U]g34 |

[51] Int. Cl.$^5$ .............................. B29C 45/76
[52] U.S. Cl. .................. 264/40.1; 264/40.5; 264/40.6; 264/297.2; 425/135; 425/144; 425/150; 425/160; 425/575; 425/588
[58] Field of Search ............ 264/40.1, 40.5, 40.6, 264/40.7, 297.2, 297.8, 294, 328.1, 328.11, 328.8, 328.16; 425/135, 143, 144, 150, 155, 160, 162, 168, 185, 190, 192 R, 542, 547, 552, 574, 575, 588, 253, 254; 364/476

[56] References Cited

U.S. PATENT DOCUMENTS

| 3,833,329 | 9/1974 | Ulmachneider et al. | 425/246 |
| 4,128,384 | 12/1978 | Albright | 425/253 |
| 4,519,761 | 5/1985 | Kenmochi et al. | 425/542 |
| 4,575,328 | 3/1986 | Fierkens et al. | 425/186 |
| 4,690,626 | 9/1987 | Krzepinski | 425/161 |

FOREIGN PATENT DOCUMENTS

| 243828 | 11/1987 | European Pat. Off. | 425/575 |
| 59-83607 | 5/1584 | Japan | 425/575 |
| 54-15697 | 6/1979 | Japan . | |
| 58-173635 | 10/1983 | Japan . | |
| 61-89019 | 5/1986 | Japan . | |

Primary Examiner—Jill L. Heitbrink
Attorney, Agent, or Firm—Fitzpatrick, Cella, Harper & Scinto

[57] ABSTRACT

A molding apparatus transfers plural molds in succession through a temperature elevating step, an injection molding step, pressurized cooling step and a molded article removing step. The apparatus is provided with plural cooling presses for the pressurized cooling step and so constructed as to prevent the stagnation in the transfer of the molds according to the molding conditions and the number of molds.

19 Claims, 22 Drawing Sheets

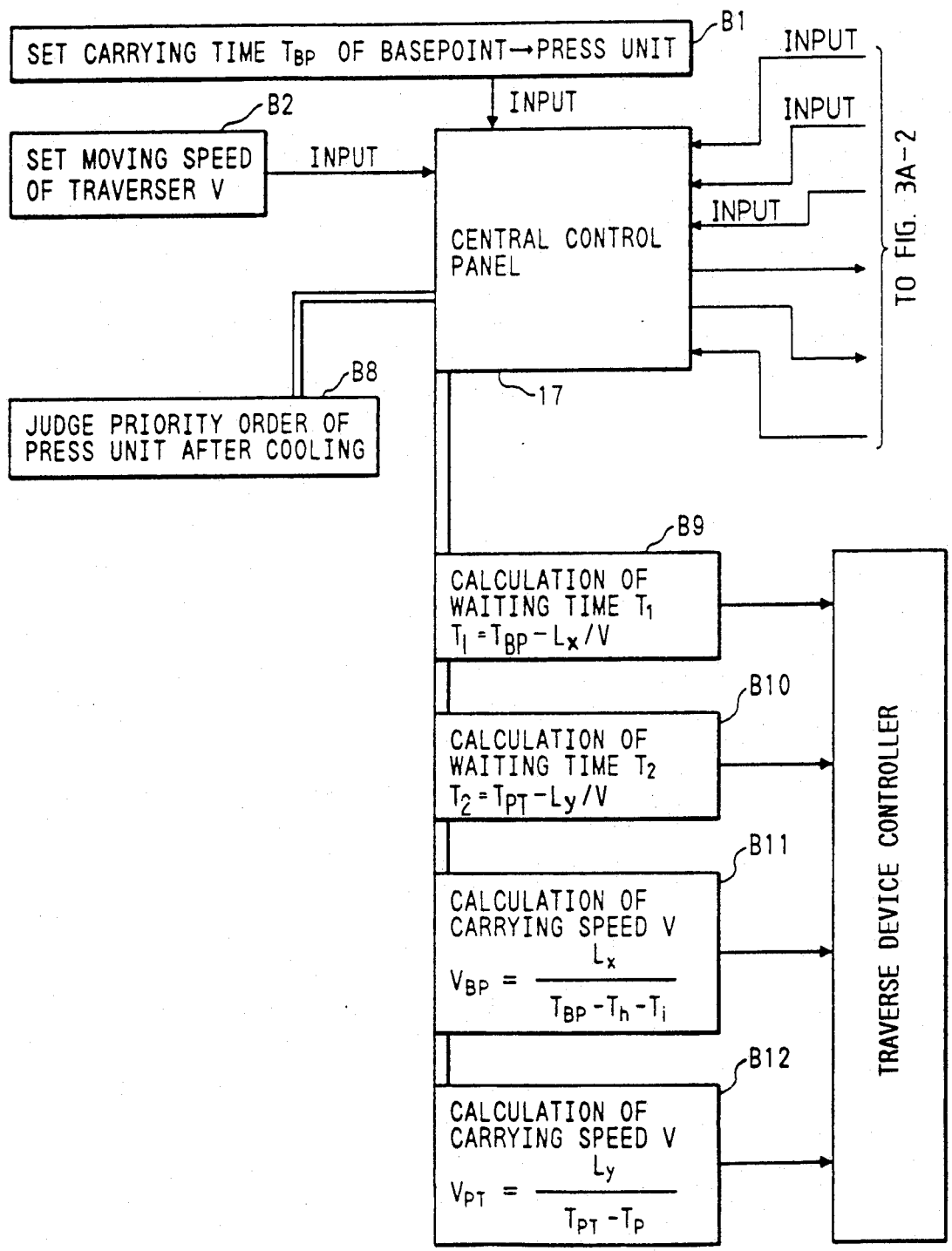

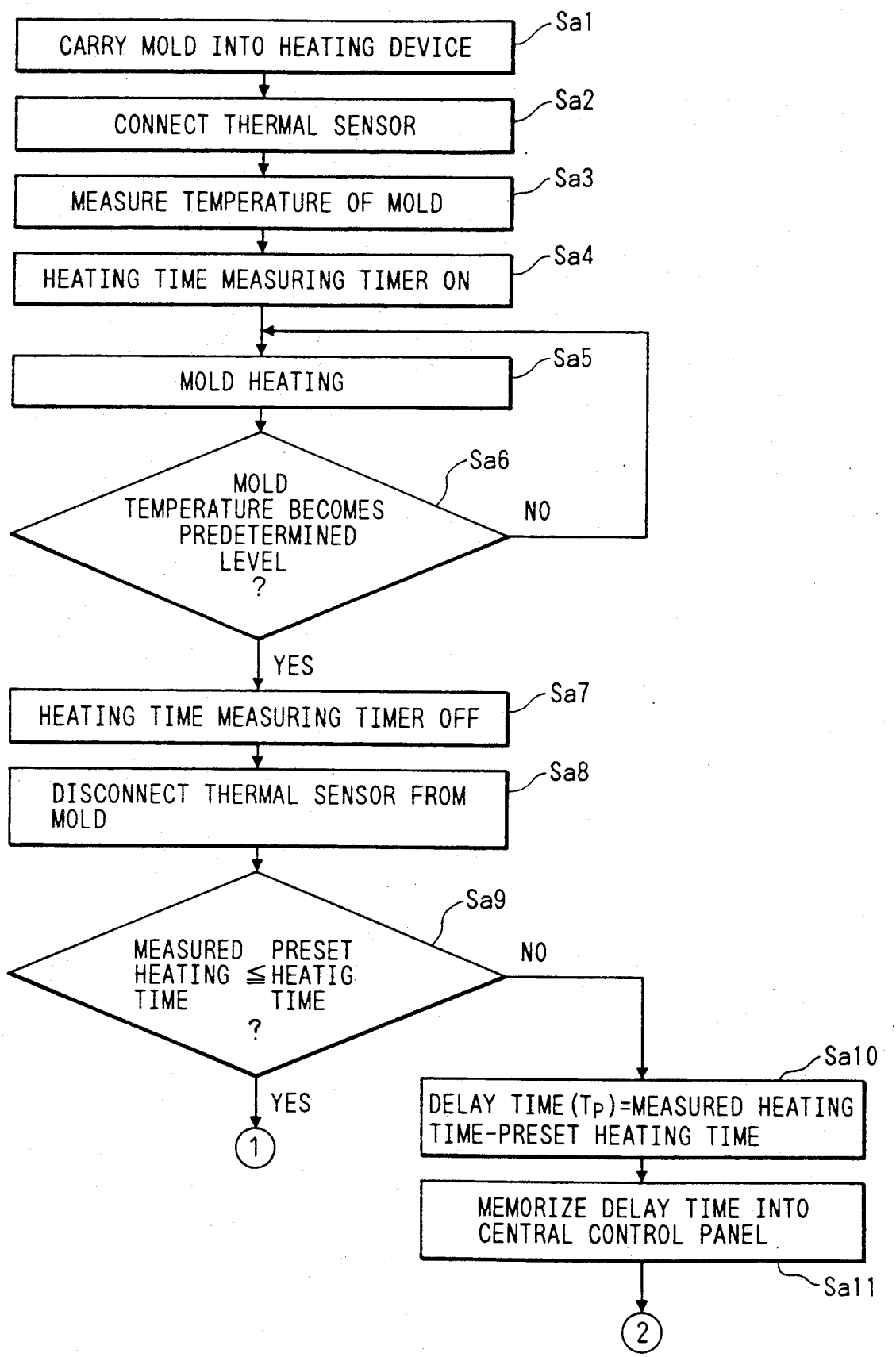

| FIG. 4D-1 |
| FIG. 4D-2 |

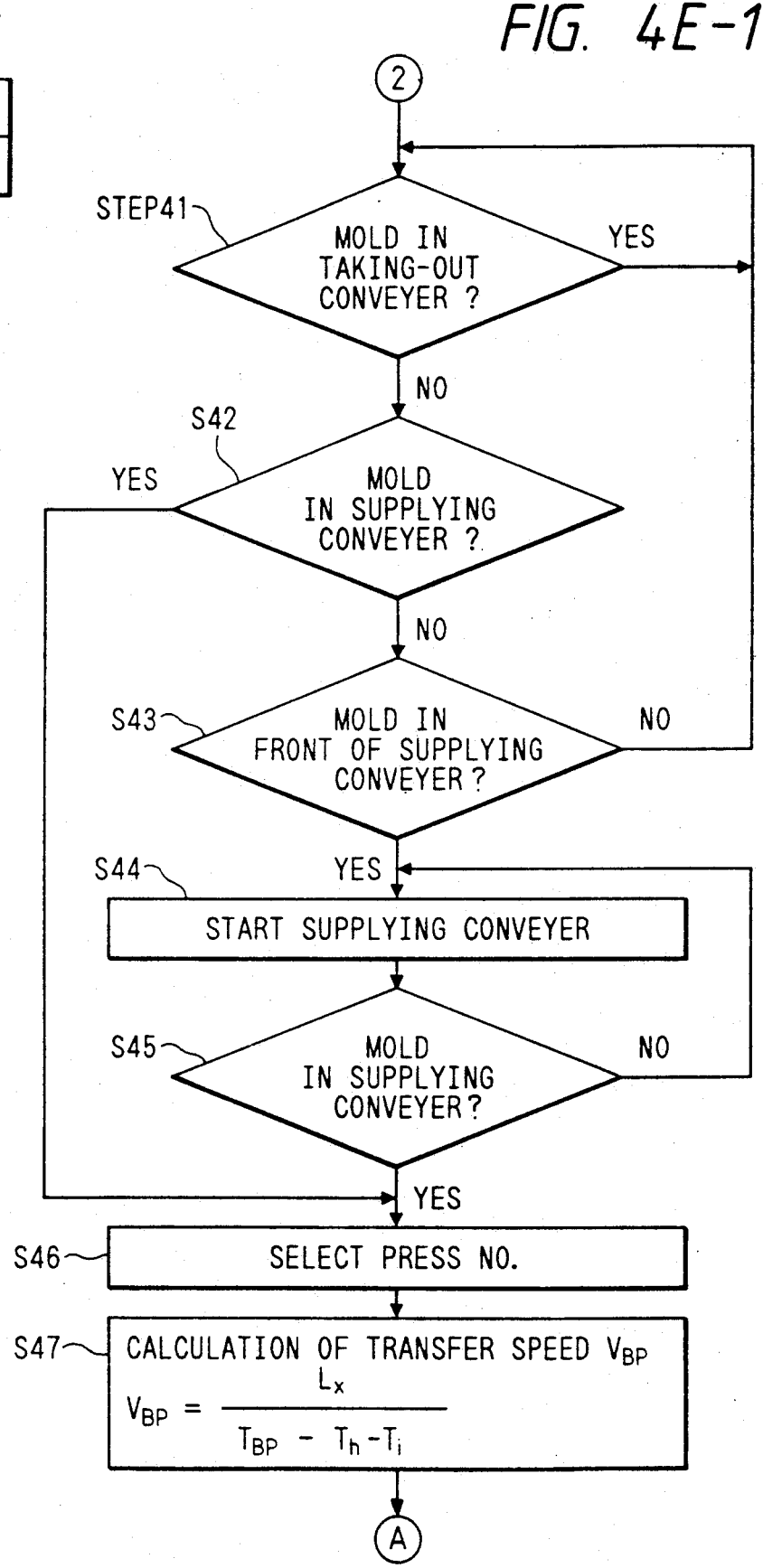

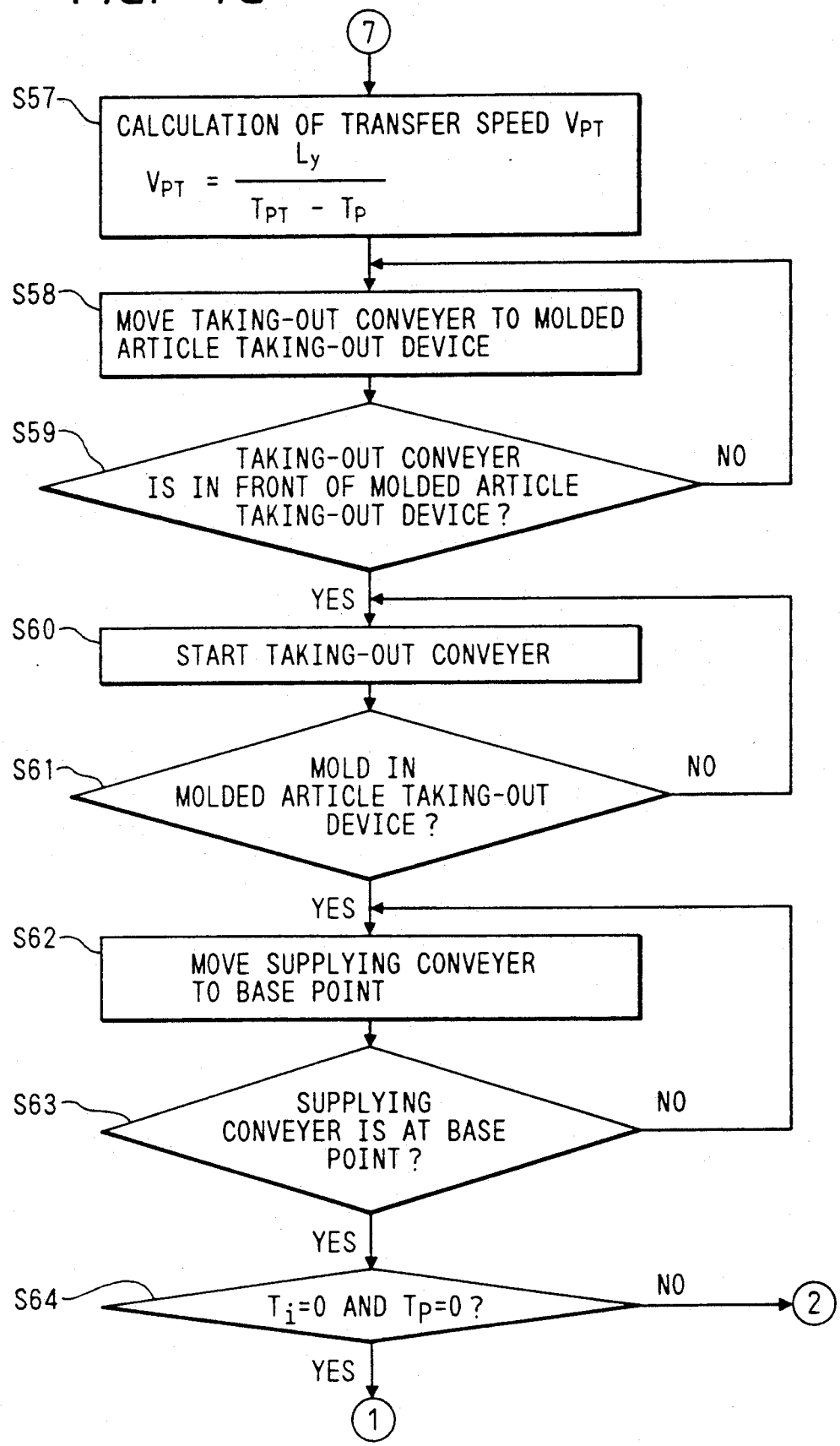

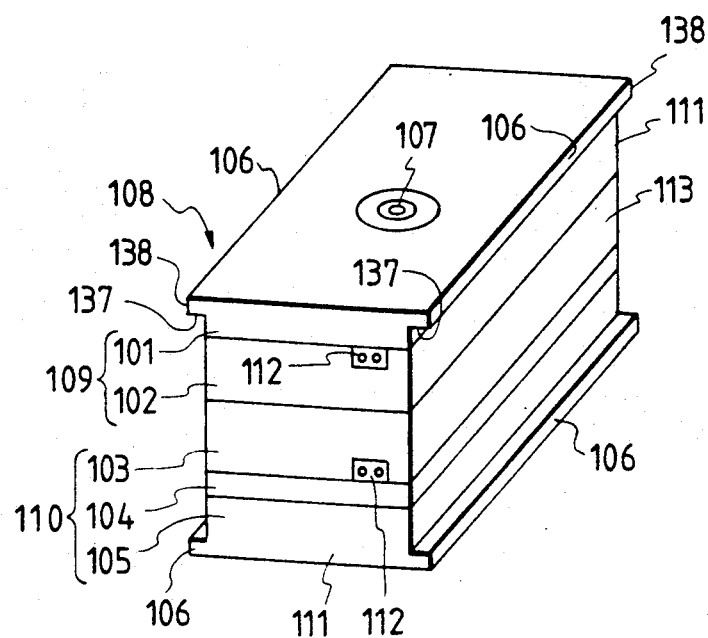
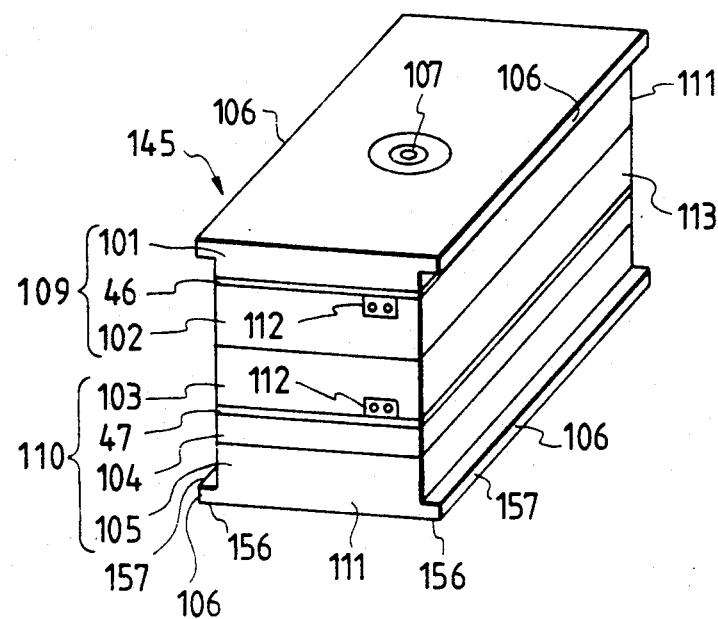

MOLDING PROCESS AND APPARATUS FOR TRANSFERRING PLURAL MOLDS TO PLURAL STATIONS

BACKGROUND OF THE INVENTION

1. Field of the Invention

The present invention relates to a process for forming molded articles by transferring plural molds in succession through a temperature elevating step, an injection molding step, a pressurized cooling step and a molded article removing step, and an apparatus adapted for executing said process.

2. Related Background Art

In the injection molding of plastic materials or the like, the efficiency of injection molder will be low if the hardening by cooling of the resin injected from the injection molder and the removal of thus hardened resin are conducted in the position of injection molding, as the injection molder cannot execute the next injection until the injected resin solidifies. Also there may be solidification of the resin in the outlet path of the injection molder. For this reason there has been proposed a molding system utilizing plural molds, in which a mold subjected to the resin injection by the injection molder is moved to another position for cooling and the injection molder proceeds immediately to the injection in a next mold, as disclosed in the Japanese Laid-open Patent Sho 58-173635.

Also the present applicant has proposed, in the Japanese Laid-open Patent Sho 61-89016, such molding system which is provided with an injection molder and plural presses and in which the mold filled with the resin by the injection molder is moved to one of said plural presses for cooling therein under temperature control and under pressurizing.

Furthermore the present applicant has proposed a molding system in which a guide and a traverser moving thereon (hereinafter called traversing device) are employed for transferring the mold from the injection molding step to one of plural presses positioned along said guide, and then to a next step, as described in the Japanese Laid-open Patent Sho 61-89019, FIG. 6.

SUMMARY OF THE INVENTION (1) In a molding system in which molds are transported with an above-mentioned traversing device, the molds are generally transported from the injection molding step to a predetermined position along the guide, called a base point, and then transported from said base point to different presses.

In order to achieve smooth operation of the system without stagnation in the movement of the molds, it is necessary to transfer the molds at a regular interval.

However, in the above-explained system, since the presses have respectively different distances from the base point, different periods are required for the transfer from the base point to the different presses. On the other hand, since the molds are transferred at a regular interval from the presses to the next step as explained above, the pressurized cooling time becomes different among the presses.

Also in the transfer of the molds from the presses to the next step, the time required for such transfer is different among the presses, so that the period of the next step becomes different among different molds.

However, if the pressurized cooling time in different presses or the process time in the next step is maintained constant, the transfer of the molds is inevitably delayed. Consequently the molds cannot be transferred at a regular interval, and the flow of molds is stagnated.

Also in case of pressurized cooling with plural molds, uniform cooling is not possible because of the fluctuation in the temperature characteristics of the molds even if the pressurized cooling time is maintained constant among different presses. In order to ensure the precision of the molded articles, temperature control for individual molds is necessary, but such individual control results in differences in the process time due to the differences of the temperature characteristics of the molds, thus hindering the smooth flow of the system and reducing the productivity The present invention, achieved in consideration of the foregoing, is to provide a molding process with plural molds, capable of achieving smooth flow of the system without stagnation of the flow of the molds and providing uniform molded articles of a high precision, and an apparatus therefor.

(2) In injection molding of resin into a mold, the mold is often heated to a predetermined temperature in advance. So-called molding sink or other defects, resulting from the solidification of the resin surface only, can be prevented by heating the mold beyond the transition point of resin (temperature at which the resin changes from liquid to solid) prior to injection of resin and cooling the mold and the resin to a temperature below the transition point.

In the conventional injection molder, a heater incorporated in the mold is used for heating said mold to a predetermined temperature prior to the resin injection.

However, in a molding system, it is preferable to effect the temperature elevation in a separate position and transfer thus heated mold to the injection molding step, in order to improve the efficiency of use of the injection molder.

In such molding system, if a heater is incorporated in the mold for heating the mold with an electric current, said heater has to be connected to an external power source when the mold is transferred to the temperature elevation step. Since the heating of the mold generally requires a high electric power, the connection between the heater and the external power source tends to involve danger such as shortcircuiting.

On the other hand temperature elevation by heat transmission or radiation by placing the mold in a furnace with a heated internal space is difficult to achieve exact temperature control of the mold, and is associated with an inferior heating efficiency.

Consequently, in such molding system, a novel temperature elevating device has been longed for.

In consideration of the foregoing the present invention is to provide a temperature elevating device, adapted for use in a molding system, capable of precise temperature control of the mold with a satisfactory heating efficiency, and without the danger such as shortcircuiting.

(3) In molding, for example, of a plastic lens requiring a large thickness and a high precision, if the mold is cooled by applying a temperature control plate with a press unit or the like, the cooling time is determined by the thickness of the molded article and the thermal conductivity of the resin. If the cooling is forcedly made rapid, there will result a temperature difference within the molded article, and the surface thereof is solidified first even while the interior is still fluid. The solidification of the interior thereafter causes the contraction of the internal resin, thus pulling the already solidified external surface and inducing the molding sink, thereby deteriorating the surfacial form.

It is therefore conceived, in order to prevent the molding sink and to improve the pattern transfer of the cavity surface by providing a movable piece in a piece constituting the cavity of the mold, providing a compression rod for moving said movable piece in the mold, further providing the temperature control plate of the press unit with a pressing mechanism for pressing the other end of said compression rod and pressing the compressing rod and the movable piece in contact therewith by said pressing mechanism at the pressurized cooling of the mold in said press unit, thereby elevating the internal pressure of the resin present in the cavity.

However, if an oil cylinder is employed as said pressing mechanism, there is generated oil mist which floats in the air and is deposited on the surface of the cavity when the mold is open, and the heating of the mold in this state results in deterioration of the surface of the cavity or the carbonization thereof Also if resin is injected into the cavity while the oil mist is deposited on the surface thereof, the oil is involved in the resin, and, in case of lens molding, there will be obtained a misty lens.

Also such oil cylinder requires a drive source in addition to that for the press mechanism of the press unit, so that the press unit inevitably becomes larger and more complex.

In consideration of the foregoing, the present invention is to provide a pressurized cooling mechanism of a simple structure, free from oil mist generation in the pressing of the compression rod.

For solving the above-mentioned drawback (1), there is provided a molding process by transferring plural molds in succession through a temperature elevation step, an injection molding step, a pressurized cooling state and a molded article removing step, comprising transfer means for transferring each mold through said steps; and discrimination means for discriminating the transfer speed of said mold or the transfer waiting time thereof, wherein the transfer of said mold is controlled by said discrimination means. in such., a manner that the information on the state of the mold such as heating or cooling thereof is obtained and utilized for controlling the speed of mold transfer means or maintaining the mold in waiting state, and that the transfer of the mold is controlled by a comparator means for comparing said information of the mold with predetermined information.

Also in order to prevent the stagnation of the molds resulting from fluctuation in the heating time of the mold in the temperature elevation step, there is provided a molding process with plural molds, comprising first time measuring means for measuring the heating time of the mold in the temperature elevation step; control means for presetting the heating time according to the article to be molded; and first comparator means for comparing the signal from said measuring means with the signal from said control means, wherein the transfer of said molds is controlled either by the waiting time or by the transfer speed according to the result of the comparison by said first comparator means.

Also in order to prevent the stagnation of the molds resulting from fluctuation in the heating time in the course of transfer from the temperature elevating step to the injection molding step, there is provided a molding process comprising temperature measuring means for measuring the temperature of said mold in the course of or after the transfer from the temperature elevating step to the injection molding step; control means for setting the heating time for said mold from said temperature elevating step to said injection molding process; and comparator means for comparing the signals from said time measuring means and said control means, wherein the transfer of the mold is controlled either by the waiting time of the mold or by the transfer speed thereof according to the result comparison by said comparator means.

Also in order to prevent the stagnation of the molds resulting from the difference in the cooling speed of the molds cooled in plural molders in the cooling step, there is provided a molding process with plural molds comprising a traverser for transferring the molds from a cooling unit to a removing stage; time measuring means for measuring the cooling time of the mold in the pressurized cooling step; control means for setting the cooling time for the mold in said pressurized cooling step; and comparator means for comparing the signals of said time measuring means and said control means, wherein the traverser is controlled either by the waiting time thereof or by the speed thereof according to the result of the comparison by said comparator means. and a molding apparatus comprising first transfer means for transferring the mold from the injection molding step to a predetermined position in the pressurized cooling step; a traverser for receiving the mold from said first transfer means and transferring the same to a cooling unit in said pressurized cooling step; means for driving said traverser; means for detecting the presence of the mold in said first transfer means and in said traverser; and control means for driving said drive means based on the signal from said detecting means.

Also in order to solve a drawback that the cooling speed of the molds stored in plural molding unit of the pressurized cooling step is aberrated from the preset cooling speed depending on the circulation conditions, there is provided a molding process in which plural molds are inserted in an injection molder for injection molding, then are transferred in succession to a pressurized cooling step with plural cooling units, and are further transferred, after cooling, to a molded article removing step, comprising means for supplying each of said cooling units with cooling medium; means for detecting the temperature of the mold set in each of the cooling units; means for measuring the cooling time of the mold set in each of said cooling unit; means for storing predetermined cooling time and cooling temperature of the mold; and control means for switching the cooling temperature of said cooling medium, wherein the temperature and cooling time of the mold in each of said cooling units are compared with the cooling temperature and cooling time preset in said memory means, and the temperature of the cooling medium to each mold is switched according to the result of said comparison.

Also in a structure in which plural molding units are provided in the pressurized cooling step and molds are cooled in said molding units, the traverser has to be moved to the position of already cooled mold, in order to transfer the cooled molds in succession from the molding units. For achieving this object, there is provided a molding apparatus with plural molds comprising means for detecting the cooling temperature of each cooling unit; means for measuring the cooling time of the mold in each cooling unit; means for memorizing a cooling curve indicating a temperature corresponding to the cooling time of the article to be molded; control means for extracting the molds from said plural cooling units, adapted for receiving information from said memory means and signals indicating the cooling time and temperature of the mold in each of said cooling units, and releasing extraction signals on already cooled molds in said plural cooling units; and traverse means for transferring said molds between said pressurized cooling step and said molded article removing step, having means for controlling a traverser for transferring said molds; wherein said control means is adapted to move said traverser to the position of a cooling unit holding an already cooled mold in response to the extraction signals from said removing control means.

Also, in order to solve the above-mentioned drawback (2), there is provided a temperature elevating device for use in a molding system, comprising a temperature regulating member to be in contact with the surface of said mold.

Also there is provided a temperature elevating device, for use in a molding system in which a mold provided with a grip portion along the ridge of an end face of the upper or lower mold is heated in a step separate from the injection molding step, and thus heated mold is transferred to the injection molding step for forming a molded article, comprising a guide member for guiding and supporting said grip portion, and a temperature regulating member to be in contact with the surface of said mold.

Also there is provided a mold structure, for use in a molding system, wherein a heat insulating member is provided in the vicinity of a piece constituting the cavity surface of the mold, whereby the vicinity of said piece is made thermally independent from the upper and lower faces of said mold and heat transmission is conducted from the lateral faces of said mold.

For solving the above-mentioned drawback (3), there is provided a pressed cooling mechanism for use in a molding system in which temperature regulating plates are mounted on both pressing parts of a press unit and the mold after resin injection is subjected to pressurized cooling while it is sandwiched between said temperature regulating plates, wherein said mold comprises a fixed piece having a cavity; a movable piece having a cavity for constituting molding surfaces in cooperation with the cavity of said fixed piece; and a first compression rod for driving said movable piece, wherein one of said temperature regulating plates accommodate a second compression rod fixed on a base member and is maintained in floating state from said base member by a spring, and, when the press unit is activated against the force of said spring, said second compression rod presses said first compression rod which in turn pressed said movable piece to compress the resin in said cavity.

BRIEF DESCRIPTION OF THE DRAWINGS

FIG. 3a-1 and FIG. 3A-2, is a block diagram of a central control panel and a traverse device shown in FIG. 1;

FIGS. 4A, 4B, 4C, 4D, 4D-1, 4D-2, 4E, 4E-1, 4E-2, 4F and 4G are flow charts of the transfer of mold in different steps;

FIGS. 5 to 8 illustrate a temperature elevating device of the present invention, wherein:

FIG. 5 is an entire perspective view of the temperature elevating device;

FIG. 6 is an external perspective view of a mold to be employed in the present temperature elevating device;

FIG. 8 is an external perspective view of a mold to be employed in a second embodiment of the present invention;

DETAILED DESCRIPTION OF THE PREFERRED EMBODIMENTS

Now the present invention will be clarified in detail by embodiments thereof shown in the attached drawings.

1) At first the system structure will be explained with reference to FIGS. 1 to 4.

Figure 1:
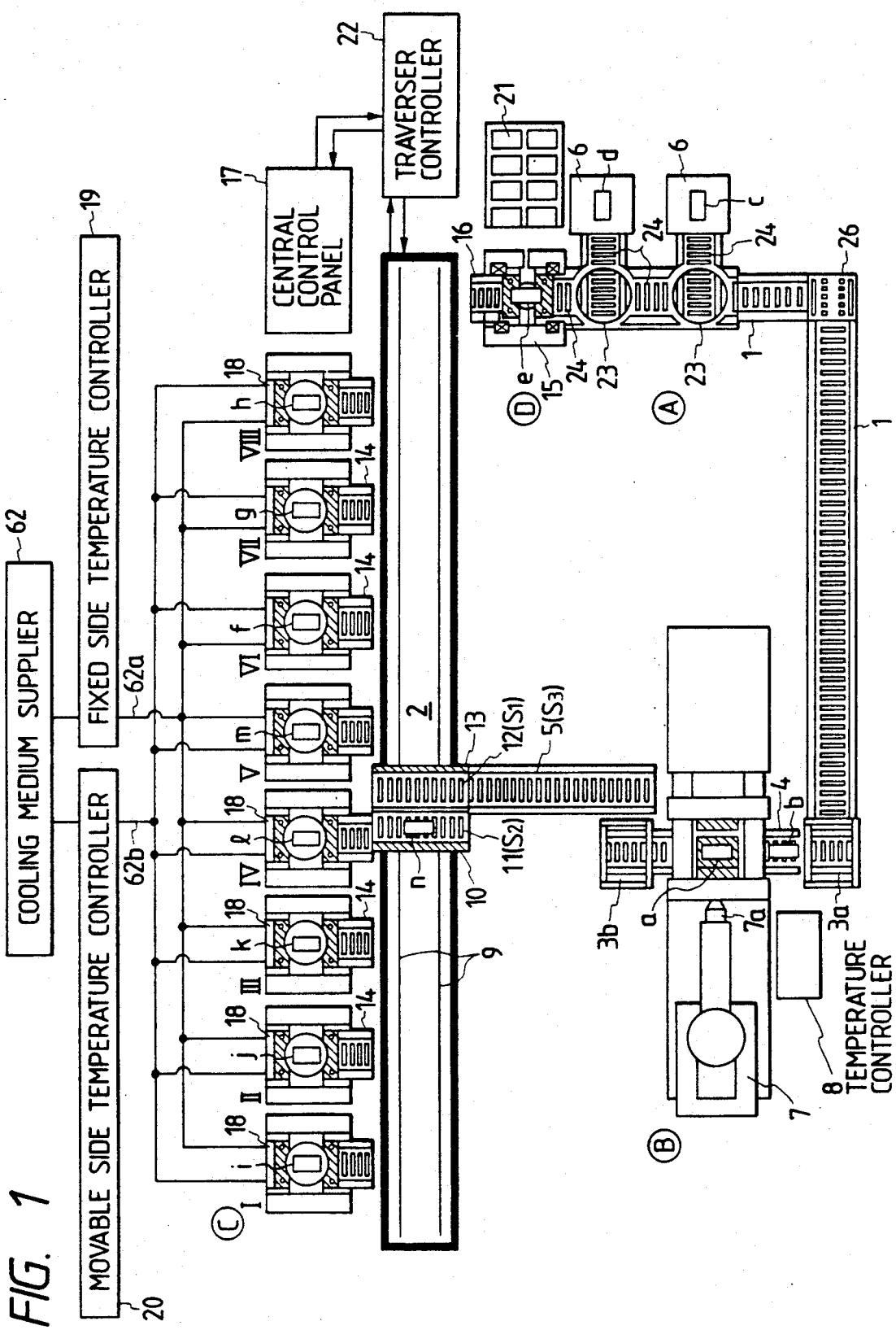
FIG. 1 is a schematic view of a molding system embodying the present invention.

FIG. 1 is a schematic view of the entire system of an embodiment.

The molding system 25 of the present embodiment is composed of a temperature elevating step A; an injection molding step B; a pressurized cooling step C; and a molded article removing step D. The steps A and B are connected by a mold conveyor path 1 utilizing rollers; the steps B and C are connected by a mold conveyor path 5 utilizing rollers and an NC traverse device 2; and steps C and D connected by an NC traverse device 2. The traverse device 2 is connected to a traverser controller 22 which is connected to a central control panel 17. Said central control panel 17 is connected also to other units of the molding system.

In the following there will be explained each unit of the molding system 25.

As the heating time in the temperature elevating step A is longer than the injection time in the injection molding step B, there are provided two heating units 6 for enabling the mold heating at the same time in both units. The structure of the heating unit will be explained in the following with reference to FIG. 5 and ensuing drawings. In front of each heating unit 6 there is provided a direction deflector 23 using rollers, which, after charging the mold, can be rotated by 90° for transferring the mold from the heating unit 6 to an injection molder 7, or from a molded article removing unit 15 to the heating unit 6. The rollers of the direction deflector 23 are driven by an incorporated drive source. The paths between the molded article removing unit 15 and the direction deflector 23, between the direction deflector 23 and the heating unit 6, and between the direction deflectors 23 are composed of conveyors 24 with rollers which can also be driven by incorporated drive sources.

In the above-mentioned heating unit, after a mold is charged therein, a temperature sensor (not shown) is attached to the mold, and said mold is heated by a heater plate (not shown). After heating to a predetermined temperature, the temperature sensor is detached, and the mold is discharged from the unit.

In the present embodiment, the temperature elevating step A is so designed as to heat the mold, which has been cooled to 80° C. in the pressurized cooling step C (to be explained later), to 100° C. in 60 seconds.

The temperature elevating step A and the injection molding step B are connected by a mold conveyor path a and a 90° rotator 3a, and an elevator 26 is provided in the 90° bent portion of the conveyor path 1. In the conveyor path 1 (first conveyor means) rollers are arranged in the transport direction of the mold and are rotated by incorporated drive sources, so that the molds are supported on said rollers and transported in said direction.

Arriving at the elevator 26 from said direction deflector 23 through the conveyor path 1, the mold changes its transport direction by 90° without change in the position thereof, and proceeds to the 90° rotator 3a.

The 90° rotator 3a rotates the mold by 90° for placing the runner of the mold in the horizontal direction, corresponding to the injection molder 7 with a horizontal injection part 7a. Then the mold is transported to a mold stand-by position 4 in front of the injection molder 7, and the temperature of the mold is measured with an unrepresented temperature sensor at said stand-by position 4. The mold which has been heated to 100° C. in the temperature elevating step A thereafter shows further temperature increase by the thermal conduction within the mold, and is transported into the injection molder 7 and subjected to injection molding when said temperature reaches the predetermined molding temperature of 120° C.

In the present embodiment, there is required a time of 120 seconds from the end of the temperature elevating step A to the arrival at the molding temperature of 120° C. at the stand-by position 4 in front of the injection molder 7.

In the injection molding step B, the mold is brought into the injection molder 7 and is subjected to pressurizing of the die set of the molder 7. After injection of resin of 220° C., the pressure is maintained for a predetermined period. Then the die set is opened the mold is transported to a 90° rotator 3b. The injection molder 7 is provided with a temperature controller 8 for regulating the mold at a temperature required for injection molding.

In the present embodiment the time from the charging of mold into the injection molder 7 to the arrival of the mold at an NC traverse device (corresponding to a base point 13 to be explained later) is 60 seconds.

The 90° rotator 3b provided behind the injection molder 7 and rotates the mold so as to return the runner thereof to the upward direction.

Thus the mold moves with its runner in the horizontal direction in the injection molding step B by means of the 90° rotators 3a, 3b, while it moves with its runner upwards in other steps C, D and A. Said 90° rotators 3a, 3b may be dispensed with, if the injection molder executes the injection downwards. or if the mold moves with its runner in the horizontal direction in other steps C, D and A. A mold conveyor path 5 (second conveyor means) transports the mold from the 90° rotator 3b to the base point 13 of the NC traverse device, where the NC traverse device 2 receives the mold. As in the conveyor path 1, there are provided rollers which are arranged in the transport direction and rotated by incorporated drive sources, for transporting the mold supported on said rollers The NC traverse device 2 is composed of two guide rails 9 and a traverser 10 moving thereon The traverser 10 is provided with a charging conveyor 11 and a discharging conveyor 12 positioned in pair at left and right. The charging conveyor 11, driven by an incorporated drive source, receives the mold from below in FIG. 1 and sends it to above, and is used for transporting the mold from the base point 13 to different presses 18. The discharging conveyor 12, also driven by an incorporated drive source, receives the mold from above in FIG. 1 and transports it to below, and is used for transporting the mold from the presses 18 to the molded article removing unit 15.

In the present embodiment, the time required by the mold to reach one of the press units 18 from the base point 18 by the traverse device is 30 seconds, and the time from the press unit 18 to the molded article removing unit 15 is 30 seconds.

The pressurized cooling step C is composed of eight press units 18 (I–VIII), arranged parallel to the rails 9 of the traverse device 2. Each of said units is so distanced from the rails 9 as to enable transfer of the mold to and from a conveyor path 14 of the press unit 18 when traverser 10 is moved to in front of said press unit. The conveyor path 14 is driven by an incorporated drive source for transporting the mold placed thereon. The press unit 18 is provided with a set of upper and lower dies for pressurized cooling, and each die set is provided with pipes for circulating cooling medium, connected to pipes 62a, 62b of cooling medium supply means. The amount of cooling medium circulating in each die set is regulated by a fixed side temperature controller 19 and a movable side temperature controller 20 under the instruction of the central control panel 17 and the traverser controller 22. When the mold is charged into said die set, a temperature sensor is connected to the mold, and the upper and lower does move relatively to come into pressurized contact with the mold, thereby cooling the mold with the cooling medium circulating in the die set. The cooling is controlled by the speed or temperature of the cooling medium so as to obtain a predetermined cooling slope, thereby minimizing the distortion by contraction and by internal stress at the cooling of the molded article.

In the pressurized cooling step C, the mold is cooled from 120° C. to 80° C., under the temperature measurement with the sensor.

When a predetermined temperature is reached, the temperature sensor is detached and the die set is opened, and the mold is transported to the discharging conveyor 12 of the traverser 10 through the conveyor path 14.

In the present embodiment, the time of the pressurized cooling step C, from the charging of the mold into the conveyor path 14 of the press unit 18 to the discharging therefrom after cooling, is selected as 480 seconds.

In the present embodiment, the molded article removing step D is positioned at lower right part of the NC traverse device 2 in FIG. 1, where the molded article removing unit 15 and a stocker 21 at right are provided. The removing unit 15 is so distanced from the rails 9 as to enable transfer of the mold between the discharging conveyor 12 of the traverser 10 and a conveyor path 16 of the removing unit 15 when the traverser 10 arrives in front of said removing unit 15. When the mold is loaded into the removing unit 15 from the traverser 10 through the conveyor path 16, a lock of the mold is released and the mold is opened. Then the molded article is pushed out by a pushing rod, and is stored in the stocker 21. After the removal of the molded article, the mold is closed, locked and transported to the temperature elevating step A.

In the present embodiment, the period of the removing step D, from the charging of the mold into the conveyor path 16 of the removing unit 15 to the discharge of said mold after removing to the temperature elevating step A is selected as 60 seconds.

Thus, in the present embodiment, the molded articles completed by pressurized cooling in the press units 18 are not removed therein but in a separate removing unit 15 collectively. A removing unit, if provided on each press unit 18, will complicate the structure and increase the volume of the press units, and the press units I-VIII will require a large space due to the presence of respective removing units and a complicated control on the removing step. These drawbacks can be avoided in the present embodiment by the concentrated removing operation.

The traverser controller 22 controls the function of the NC traverse device 2 according to a predetermined program and under instructions from the central control panel 17, thereby realizing speed regulation and standby state of the traverser 10.

The central control panel 17 is connected to various units of the molding system 25 through control units thereof (FIG. 3A), and controls the entire molding system 25.

In the present system 25, there are provided sensors at predetermined positions for detecting whether the mold is present at such predetermined positions. More specifically, micro-switches, for example, are provided at the base point of the conveyor path 5, in the charging and discharging conveyors of the traverser 10, in the mold receiving portions of the press units 18 (I-VIII) and in a similar portion of the removing unit 15 for detecting the presence of the mold.

In the following there will be explained the arrangement and flow of the molds in the molding system of the present embodiment, with reference to FIG. 2. In this explanation it is assumed that the molds are transported as scheduled in various steps.

Figure 2:
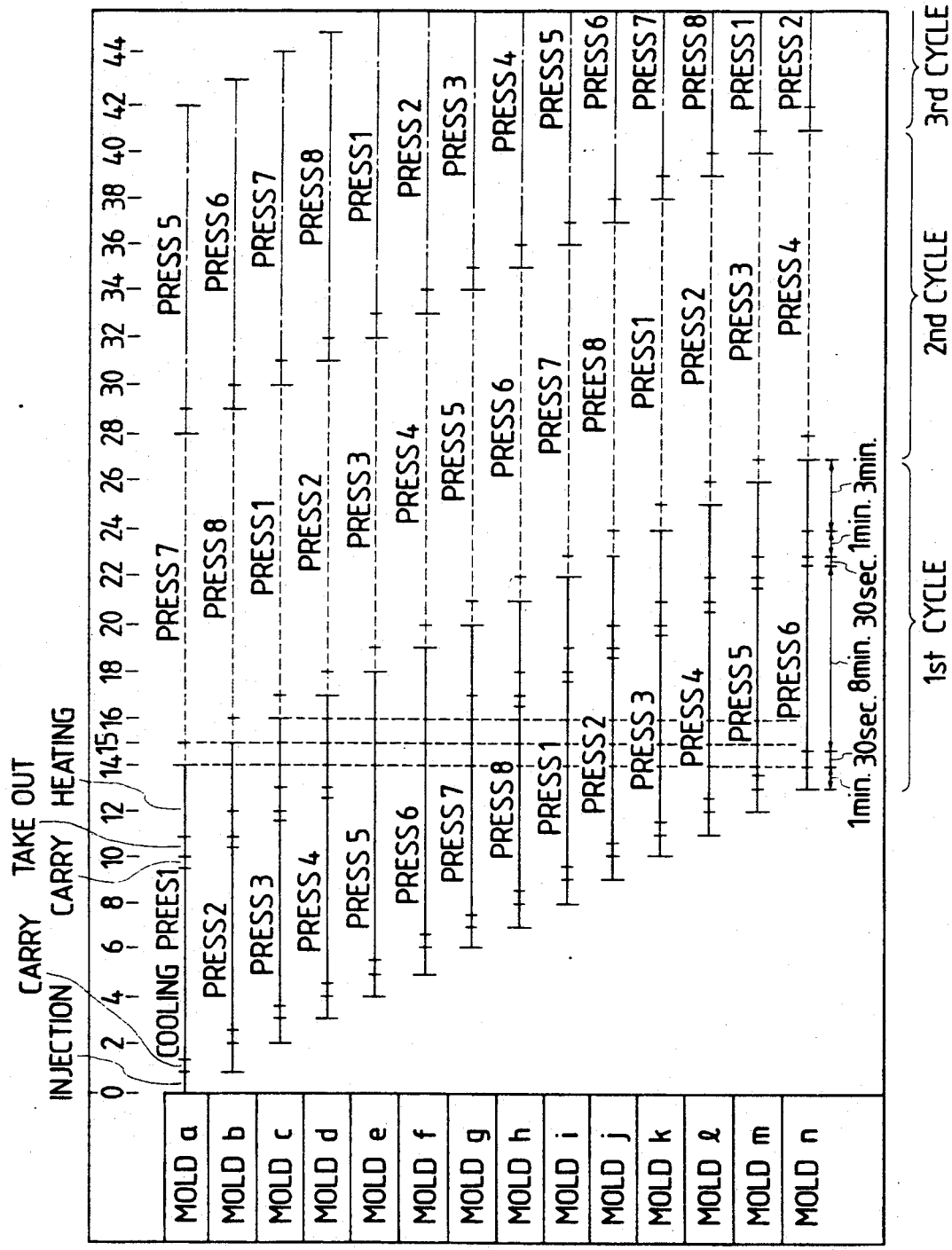
FIG. 2 is a timing chart showing the movement of the molds in the molding system shown in FIG. 1.

FIG. 2 is a timing chart indicating the positions of the molds in the molding system as a function of time indicated by minutes on the abscissa. The present embodiment is so designed that the resin injection in the injection molding step is conducted at an interval of 1 minute, based on the 1-minute time required in the injection molding step and in transportation to the base point, and that the molds move in the system with an interval of 1 minute. In the present embodiment a complete cycle of the mold requires 14 minutes, consisting of 3 minutes in the temperature elevating step and transport to the injection molder; 1 minute for the injection molding step and transport to the base point; 0.5 minutes for the transport of the mold to one of the press units; 8 minutes for the pressurized cooling step; 0.5 minutes for the removing unit 15 by the NC traverse device 2; and 1 minute for the removing step, so that 14 molds in total are required in the system. FIG. 1 shows the positions of the molds a-n at a time 14. As time proceeds to 15 in FIG. 2, said molds a-n proceeds respectively, for example the mold a to the position of the mold n, the mold n to the position of the mold f and so forth and the mold f returns to the position of the mold e. As time further proceeds to 16 in FIG. 2, the mold a, for example, proceeds from the position of the mold n to the press unit VII.

However, in the actual molding system, precise molding cannot be expected if the molds are moved exactly according to the above-explained timing chart, because the temperatures of the molds become fluctuated and different from the desired molding temperature range due to the fluctuation in the temperature characteristics of said molds. On the other hand, precise molding is made possible by effecting the cooling and heating of the molds to desired temperatures, but such process results in a fluctuation in the time of each step, thus hindering smooth flow of the molds in the system and significantly deteriorating the production efficiency. In the present embodiment, therefore, the cooling or heating in each step is continued until the mold reaches a predetermined target temperature, and the error in time, resulting from excess or shortage in each process time is compensated by the control, in waiting time or in transport speed, of the mold transportation by the traverse device 2, thereby avoiding stagnation in the transportation of the molds in the entire system.

The above-mentioned control by waiting time or transportation speed is determined according to following three conditions.

The first condition is whether the time of the temperature elevating step A, for heating the mold from 80° C. to the target temperature of 100° C. is longer or shorter than the predetermined 60 seconds. If the heating time is longer than the predetermined time (with a delay time $T_n$), compensation is achieved by increasing the transporting speed ($V_{BP}$) of the mold from the base point 13 to one of the press units 18. If the heating time is shorter than the predetermined time, compensation is achieved by providing the mold, transported by the traverse device 2, with a waiting time $T_1$ in front of the press unit 18.

The second condition is whether the mold transportation time from the temperature elevating step A to the injection molding step B, or the time from the discharge of mold from the temperature elevating step A to the temperature rise to 120° C. at the waiting position 4 in front of the injection molder 7 is longer or shorter than the predetermined time of 120 seconds. Also in this case, compensation can be achieved by the control with a waiting time or speed in the transportation of mold from the base point 13 to one of the press units 18. (In this case the delay is represented by $T_n$, and waiting time by $T_1$)

The third condition is whether the time of the pressurized cooling step C, for cooling the mold from 120° C. to the target temperature of 80° C. is longer or shorter than the predetermined time of 480 seconds. If it is longer (with a delay time $T_P$), compensation is made by the transporting speed $V_{PT}$ of the mold from the press unit 18 to the molded article removing unit 15. If it is shorter, compensation is made by providing the mold, transported by the traverser device 2, with a waiting time $T_2$ in front of the removing unit 15.

In the following there will be explained the function of the molding system of the present embodiment, with reference to FIGS. 1, 3A and 3B and also to flow charts shown in FIGS. 4A-4G.

In activating the present system, various initial values are set in the central control panel 17. Referring to FIG. 3A, the transport time $T_{BP}$ from base point 13 to the press units 18 (I-VIII) (B1); the moving speed V (B2) of the traverser 10; the transporting time (B3) from the press units 18 to the removing unit; the distance Lx (B4) between the base point 13 and each of the press units 18; and the distance Ly (B5) from each of the press units to the removing unit, are set and stored in a memory M of the central control panel 17. In said memory M there are also set the time $t_1$ of the temperature elevating step; the time $t_2$ between the temperature elevation and the injection molding steps; and the time $t_3$ in the pressurized cooling step.

Figure 4B:
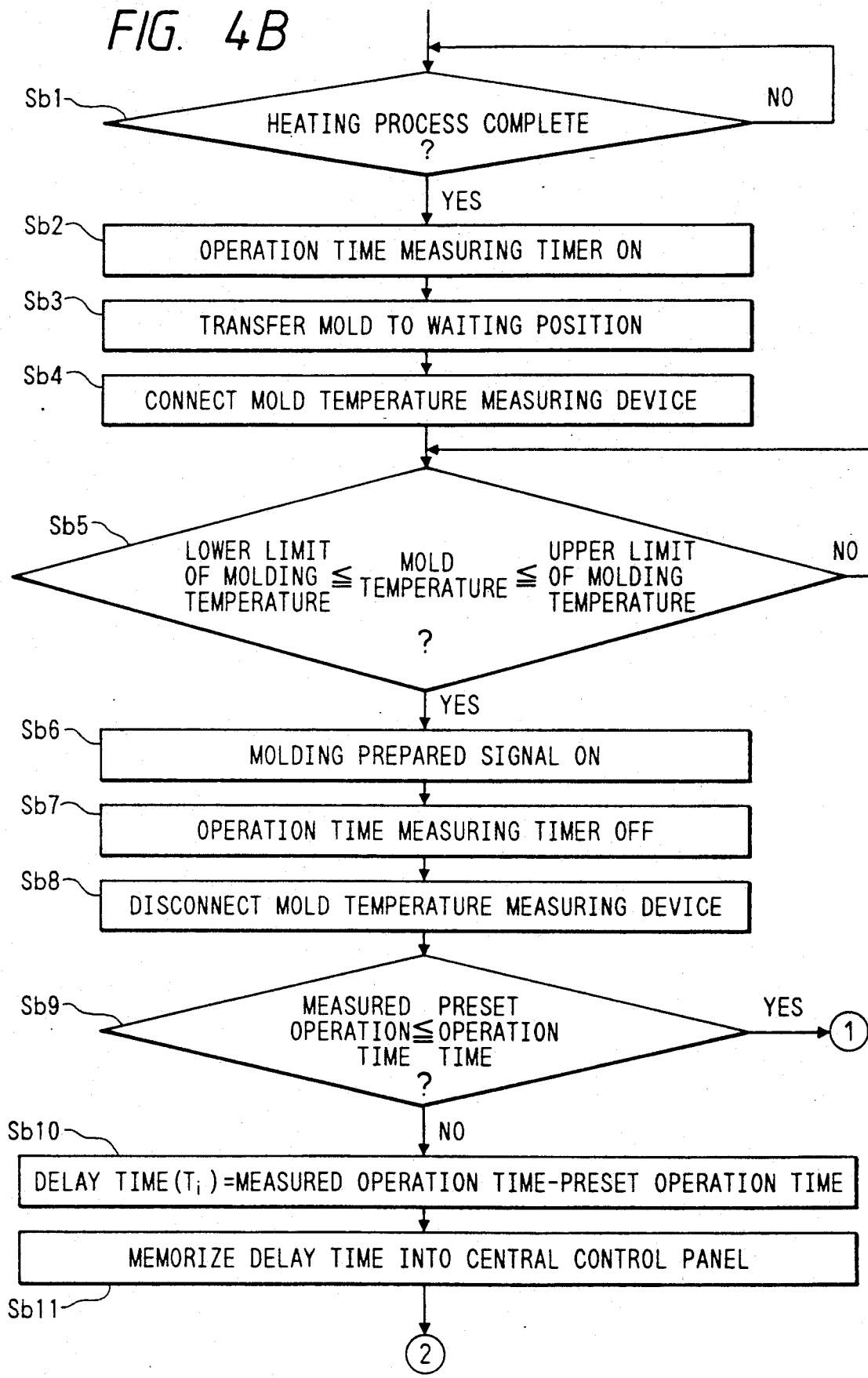

Referring to FIG. 4A showing a flow chart of the mold transportation in the temperature elevating step A, a mold emptied in the molded article removing step D is charged into the heating unit 23 (Sa1), and the temperature sensor is connected (Sa2). Then the heating is started with temperature measurement of the mold, and the measurement of heating time is simultaneously started (Sa3, 4, 5). The temperature of the mold is read by temperature measuring means 40 based on the signal from the sensor. The heating time is measured by timer means $T_1$. The heating is conducted until the mold reaches the target temperature of 100° C. (Sa6), and, when it is reached, the heating is terminated and the timer for measuring the heating time is cut off (Sa7). Then a time signal is released by the timer means $T_1$, and the temperature sensor is detected from the mold (Sa8). In the central control panel 17, first comparator means 42 compares the measured heating time with the preset heating time $T_1$ (Sa9), and, if the former is shorter than the latter, a waiting time control for the traverser 10 is conducted according to a process shown in FIG. 4D as will be explained later. If the former is equal to or longer than the latter, first calculation means 43 determines the delay time $T_n$ by subtracting the preset heating time from the measured heating time (Sa10), and said delay time $T_n$ is stored in the central control panel 17 (sa11). Then speed control of the traverser 10 is conducted from the base point 13 to the press units 8 according to a procedure shown in FIG. 4E to be explained later. Now reference is made to FIG. 4B showing a flow chart for the mold transportation from the temperature elevating step A to the injection molding step. After the completion of heating of the mold in the temperature elevating step A (Sb1), second timer means $T_2$ starts the measurement of transport time from the temperature elevating step A to the injection molding step (Sb2), and the mold is transported to the stand-by position 4 in front of the injection molder 7 (Sb3). Subsequently, in said stand-by position 4, the temperature sensor is connected to the mold (Sb4) and the mold temperature is measured by second temperature measuring means 44. After leaving the temperature elevating step A, the mold shows further temperature rise by the internal heat conduction, before reaching the stand-by position 4 in front of the injection molder 7. When thus measured temperature of the mold reaches a range between upper and lower limits of molding temperature (Sb5), a molding ready signal is released from the central control panel 17 in response to the signal from the second temperature measuring means 44 (Sb6), and said second timer means $T_2$ is turned off (Sb7). Then the temperature sensor is detached from the mold (Sb8). In the central control panel 17, second comparator means 46 compares the time $T_2$ measured by the second timer means with the preset time $t_2$ (Sb9). If the former is shorter than the latter, a waiting time control for the traverser 10 is conducted according to a procedure shown in FIG. 4D to be explained later. If the former is equal to or longer than the latter, second calculation means 48 determines the delay time $T_i$ by subtracting the preset time from the measured time (Tb10), and said delay time is stored in the central control panel 17 (Sb11). Thereafter a speed control of the traverser 10 is conducted from the base point 13 to the press units 18 according to a procedure shown in FIG. 4E as will be explained later.

Figure 4C:
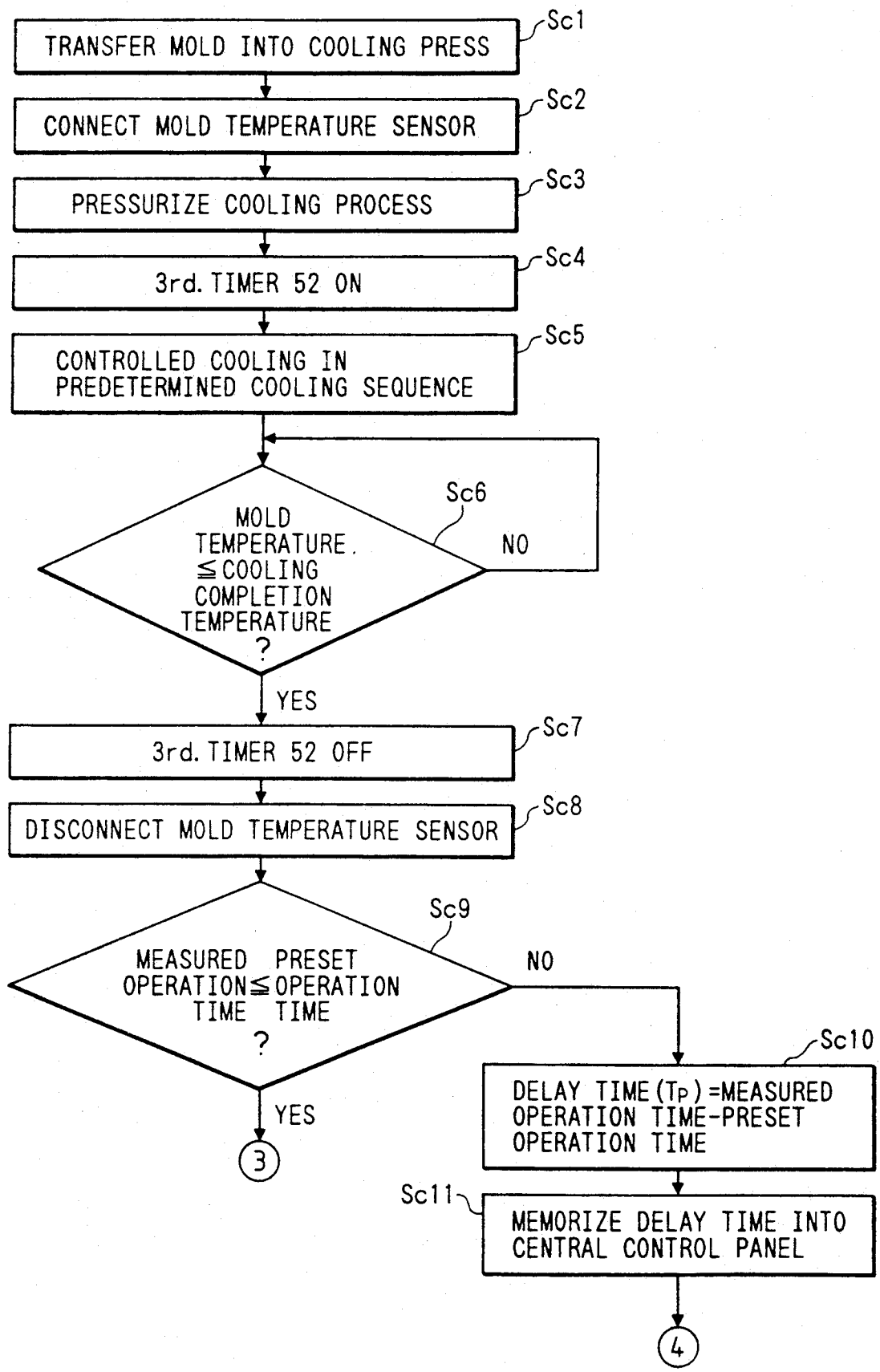

Now reference is made to a flow chart for the pressurized cooling step shown in FIG. 4C. The mold is charged into a press unit 18 (Sc1), and the temperature sensor is connected to said mold (Sc2). Then third temperature measuring means 50 is activated to start the pressurized cooling step (Sc3). At the same time third timer means 52 starts measurement of the time required for cooling (Sc4). The cooling is controlled according to a predetermined temperature slope (Sc5), and, when the mold temperature reaches the target temperature of 80° C. or lower (Sc6), the cooling is terminated by the signal from the third temperature measuring means 50 and the third timer means 52 is turned off (Sc7). Then the temperature sensor is detached from the mold (Sc8). In the central control panel 17, third comparator means 54 compares the time measured by the third timer means 52 with the preset time $t_3$ (Sc9), and, if the former is shorter than the latter, a waiting time control for the traverser 10 is conducted according to a procedure shown in FIG. 10 F as will be explained later. If the former is equal to or longer than the latter, third calculation means 56 determines the delay time $T_p$ in the cooling step by subtracting the preset time from the measured time (Sc10), and said delay time $T_P$ is stored in the central control panel 17 (Sc11). Thereafter a speed control for the traverser 10 is conducted from the press units 18 to the removing unit 15 according to a procedure shown in FIG. 4G as will be explained later.

Figures 2, 3A:
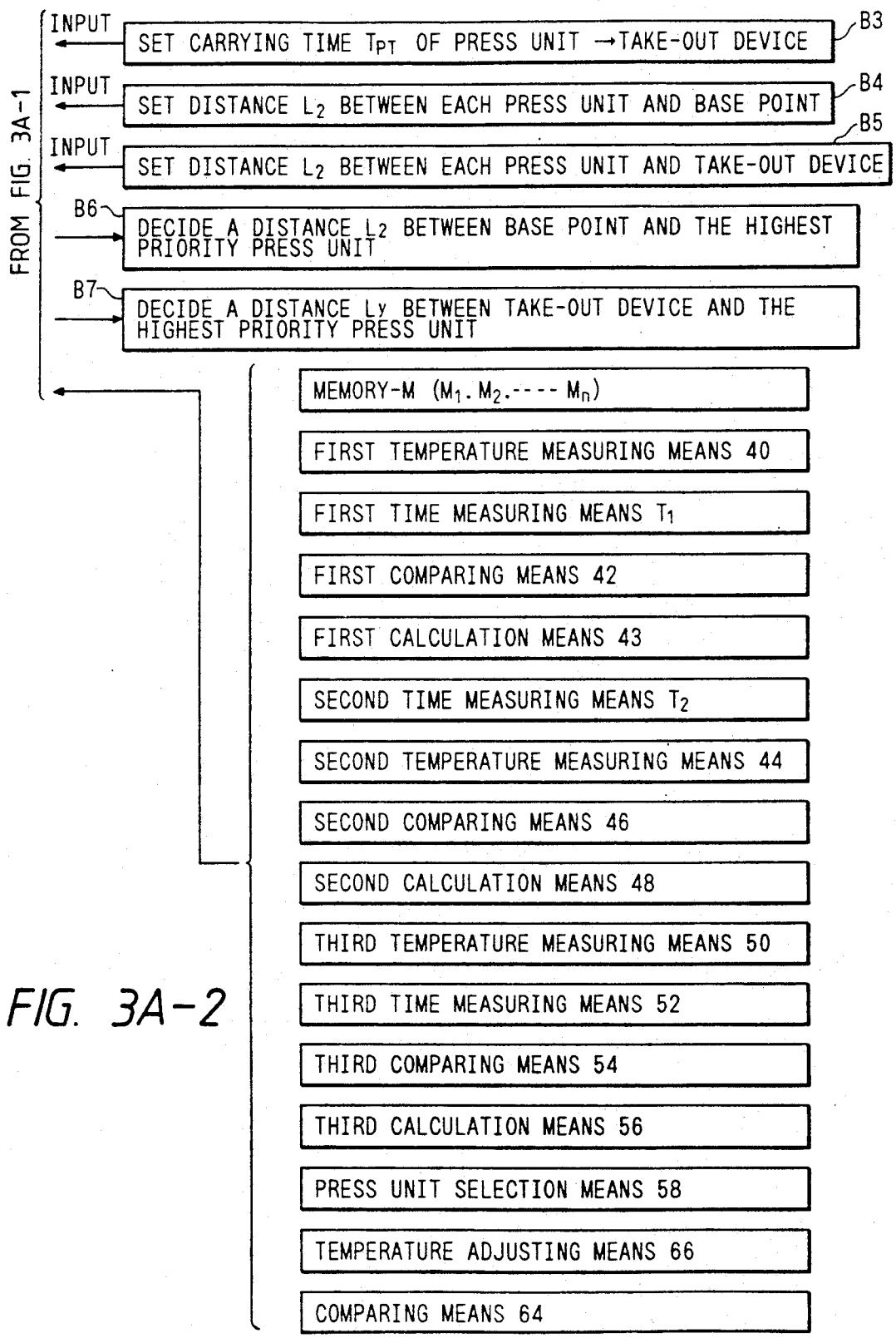
FIG. 3A, which includes
Figure 3B:
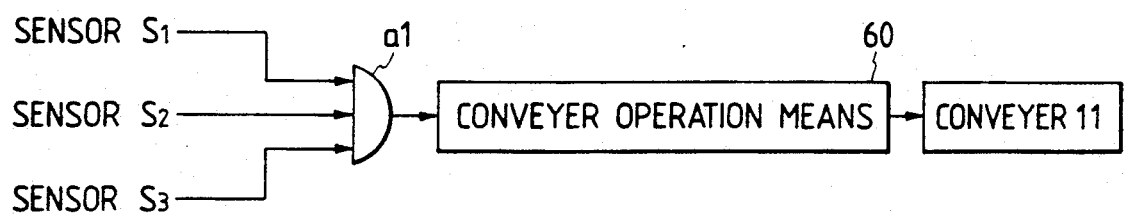
FIG. 3B is a block diagram of a conveyor operating means shown in FIG. 1.
Figure 4D:
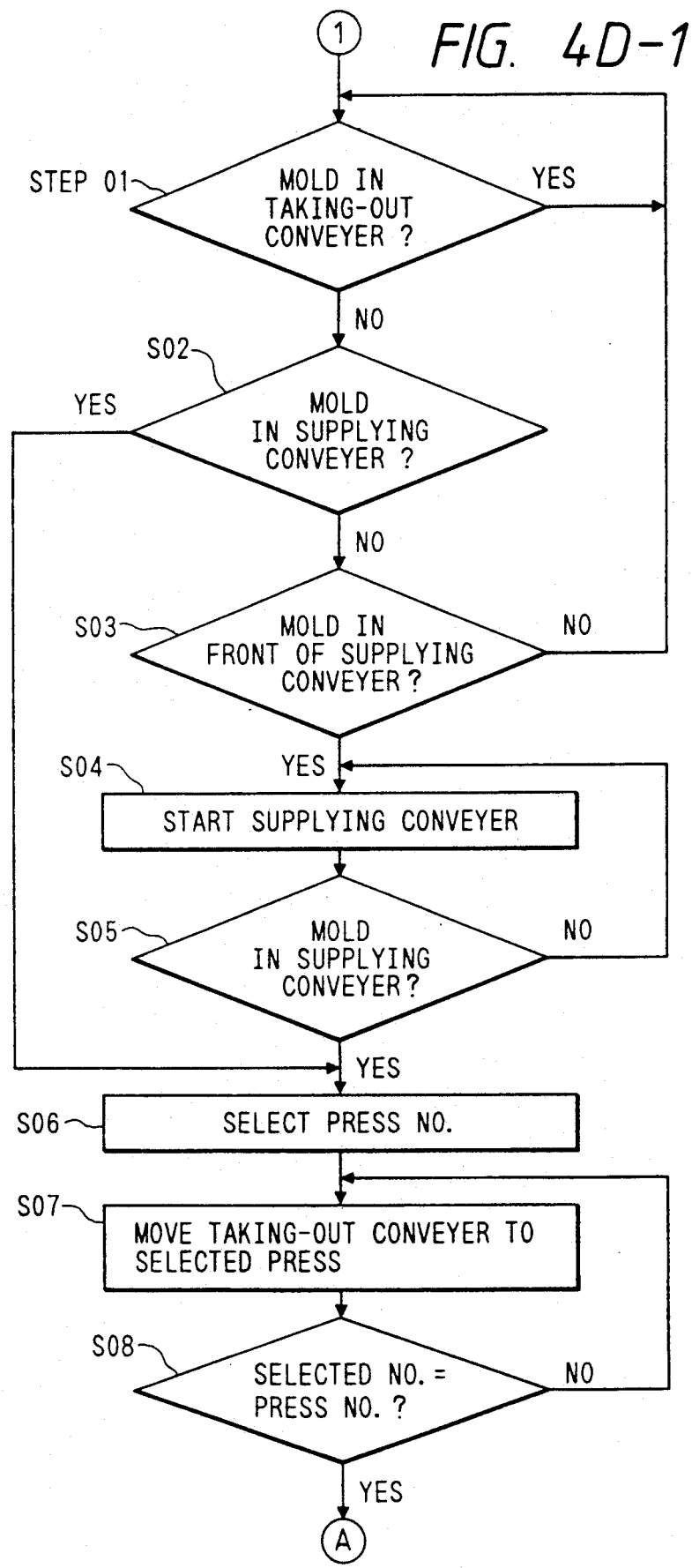
Figures 2, 4D:
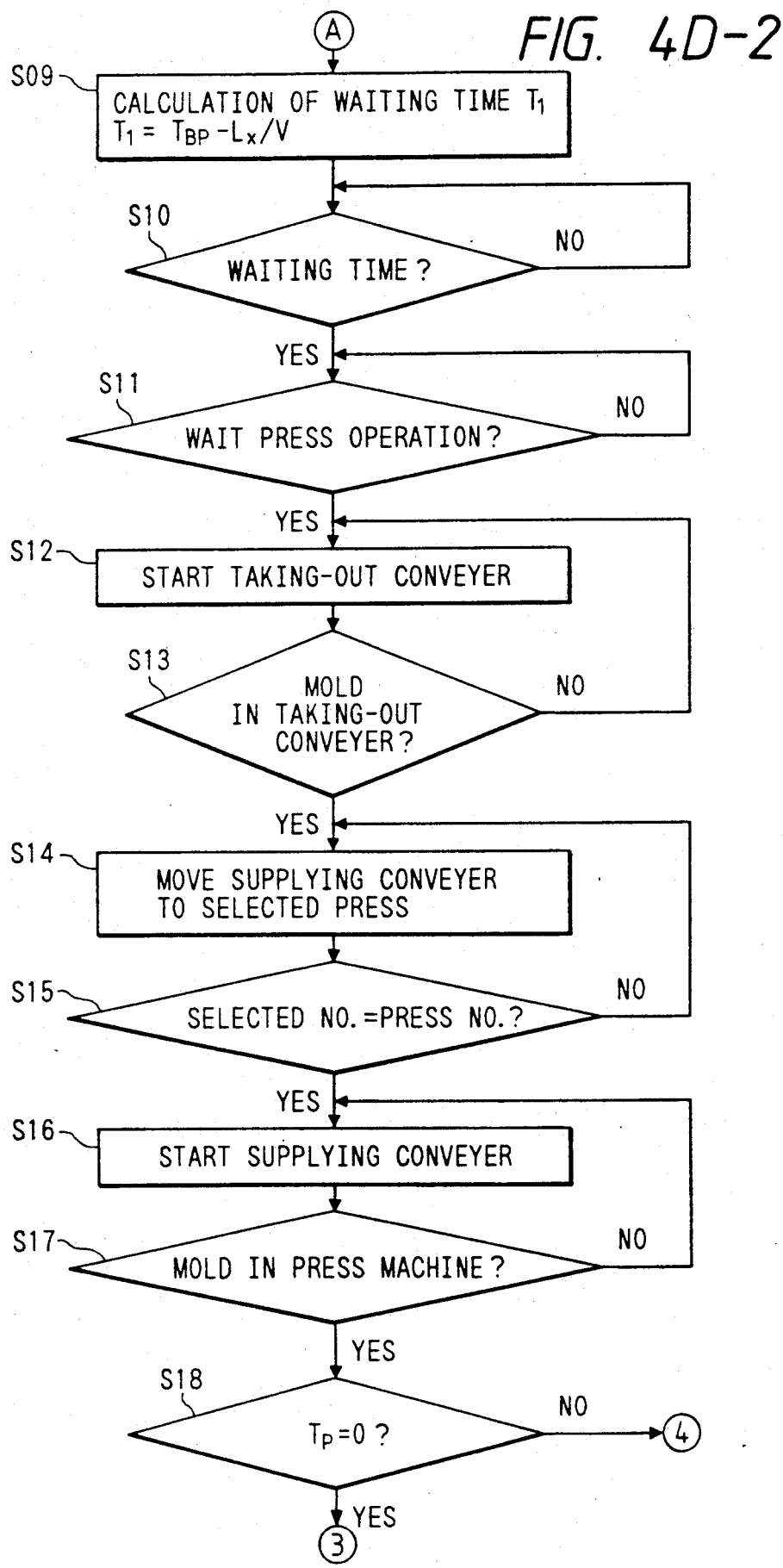

In the sequence shown in FIG. 4D, after the traverse 10 carries a mold to the removing unit 15, it returns to the base point 13 and stops at a position in which the charging conveyor 11 is aligned with the conveyor path 5. Then, in response to an instruction from the traverser controller 22, the sensor S1 in the discharging conveyor 12 confirms the presence or absence of a mold therein (SO1), and releases a confirmation signal S1. Then the sensor S2 provided in the charging conveyor 11 confirms the presence or absence of a mold therein (SO2) and releases a confirmation signal S2. Then the sensor S3 confirms the presence or absence of a mold on the conveyor path 5 in front of the charging conveyor and releases a confirmation signal (SO3). If the presence of a mold on the conveyor path 5 is confirmed, the signals of the sensors S1, S2, S3 shown in FIG. 3B are supplied to a logic circuit a1, and the charging conveyor 11 is activated by an output signal 60 from said circuit a1 (SO4), thereby placing said mold on the charging conveyor.

Then the sensor S2 confirms the presence of the mold on the charging conveyor (SO5), and press unit selecting means 58 selects a press unit to which the traverser 10 should move (SO6).

The press units (I-VIII) of the pressurized cooling step C are provided with pipes 62a, 62b for circulating the cooling medium supplied from the cooling medium supply means.

The memory M of the central control panel 17 stores preset information (curve) indicating the cooling temperature corresponding to the resin, shape and finish precision of the article to be molded.

The press units are provided with sensors D1-D8 for measuring the temperatures of the molds, and timer means P1-P8 for measuring the respective cooling times after the start of pressurized cooling. The signals of said sensors D1-D8 and of said timer means P1-P8 are supplied to the central control panel 17 and stored in the memory. In the central control panel 17, comparator means 64 compares the information on temperature and cooling time on each mold with the preset information, and sends comparison signals to a temperature controller for regulating the temperature of the cooling medium.

Said temperature controller 66 regulates the temperature of the cooling medium to be supplied to each press unit, in response to the signals from the comparator means 64.

The central control panel 17 is further provided with discrimination means for identifying a mold which has completed the pressurized cooling, from the information on the cooling time and temperature of the mold received from the press units.

Figure 3C:
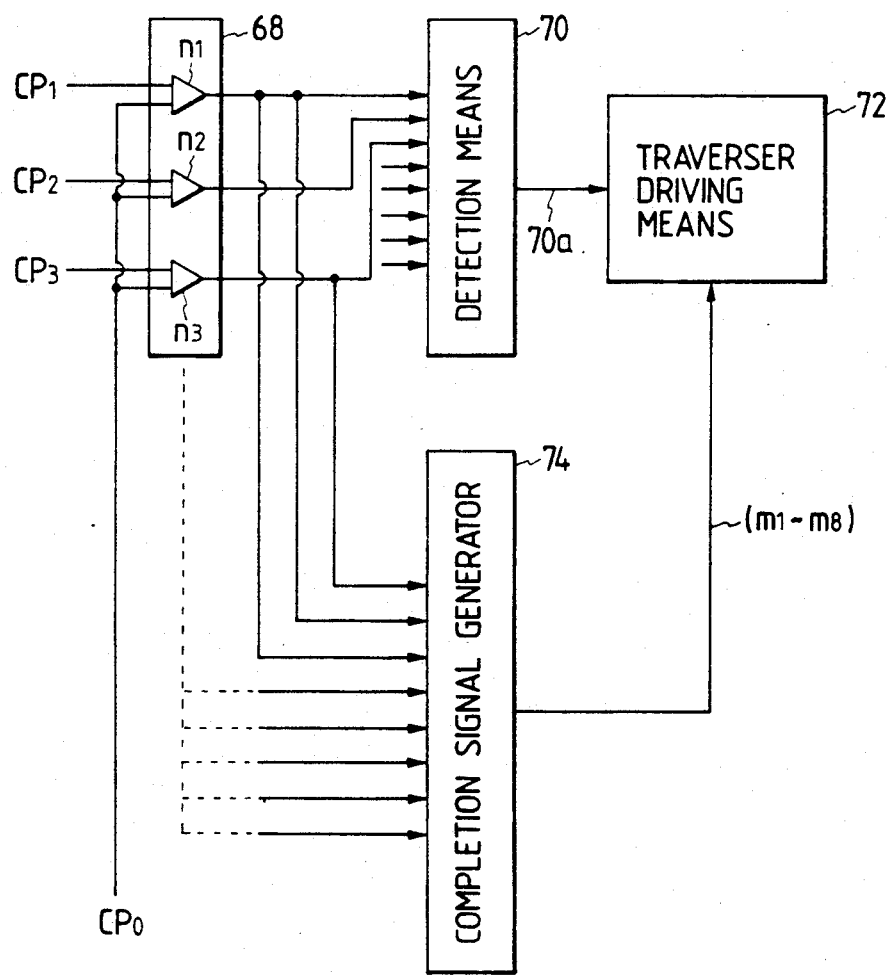
FIG. 3C is a block diagram of traverser drive means.

As shown in FIG. 3C, said discrimination means 68 supplies comparator means n1-n8 with said information (CP1, CP2, ..., CP8) and reference information CPO stored in the memory. Said comparator means releases comparison signals n1-n8 when the information from the press units reach values corresponding to the end of cooling. A mold which has completed the cooling step is identified by the detection of said comparison signals with detection means 70. The central control panel 17 sends the detection signal 70a of said detection means to the traverser controller 22.

In response the traverser controller 22 activates the traverser 10, now positioned at the base point 13, by means of drive means 72.

In response to said comparison signals n1-n8, end signal generator means 74 releases end signals m1-m8, corresponding to the press units in which the pressurized cooling is completed.

The traverser 10 is driven by the drive means 72, and is stopped at a press unit indicated by the end signal generator means. The traverser 10 waits at said stop position (SO7, SO8). The waiting time $T_1$ is determined by waiting time calculating means B9 of the central control panel 17 accordingly to:

$$T_1 = T_{BP} - L_x/V \qquad \text{(FIG. 3A, B9)}$$

(SO9), and is supplied to the traverser controller 22 which maintains the traverser 10 in the waiting state for a time $T_1$ (S10).

After said waiting, the discharging conveyor 12 is activated to transfer the mold from the press unit 18 to the discharging conveyor (S12).

Then the presence of the mold in the discharging conveyor 12 is confirmed (S13), and the traverser 10 is then slightly moved in such a manner that the charging conveyor 11 coincides with the conveyor path 14 of a press unit from which the mold has been taken out (S14, S15).

Then the charging conveyor 11 is activated (S16) to load the press unit 18 with a mold, and the presence of the mold in the press unit 18 is confirmed by the sensor (S17). Then, according to whether the measured cooling time is equal to the preset time, the central control panel 17 selects either a procedure shown in FIG. 4F or that shown in FIG. 4G (S18). More specifically, the process shown in FIG. 4G or that shown in FIG. 4F is selected respectively when the delay time $T_P$ is generated or not by the aforementioned calculation in the cooling step.

Figures 2, 4E:
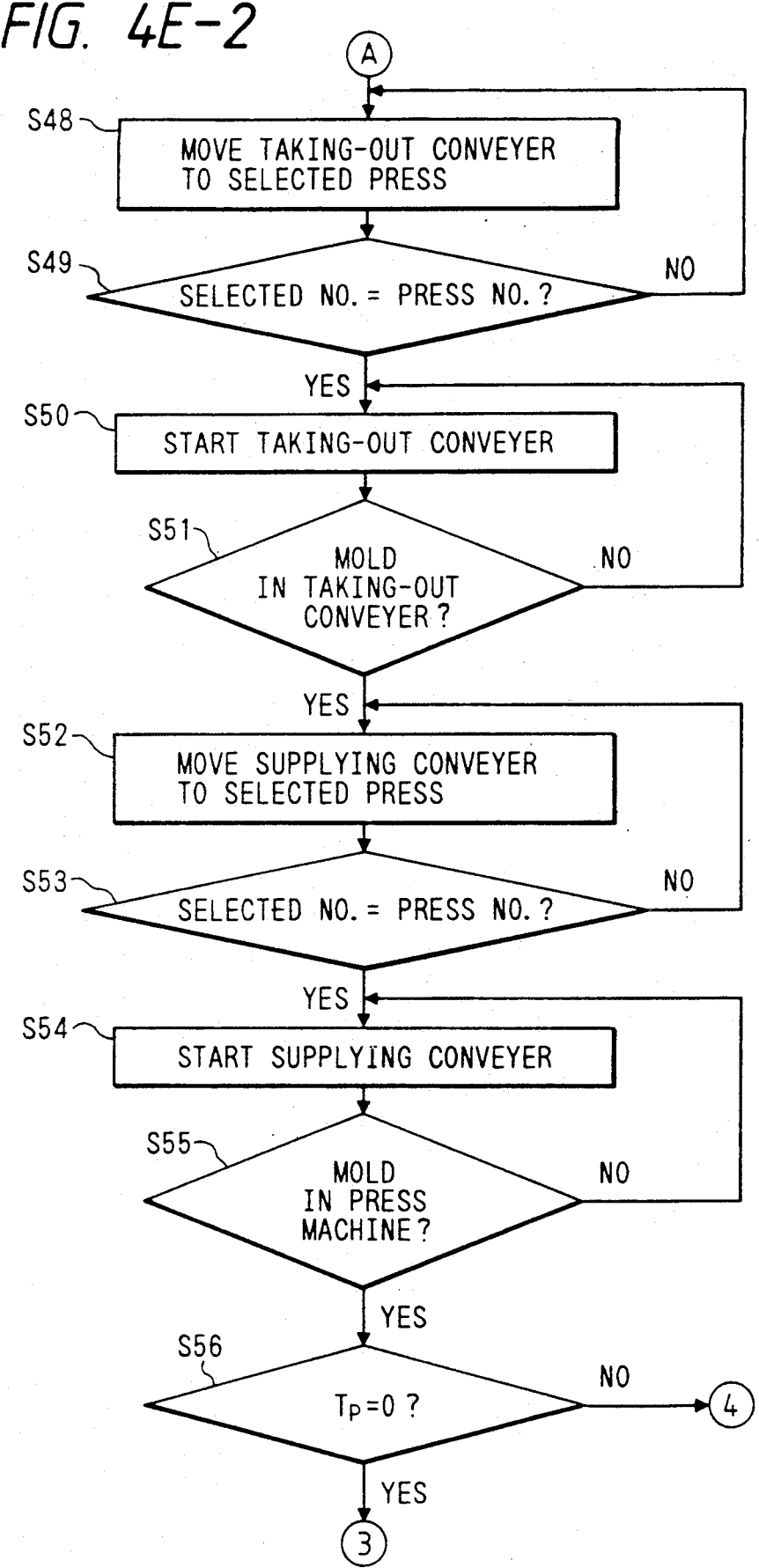
Figure 4F:
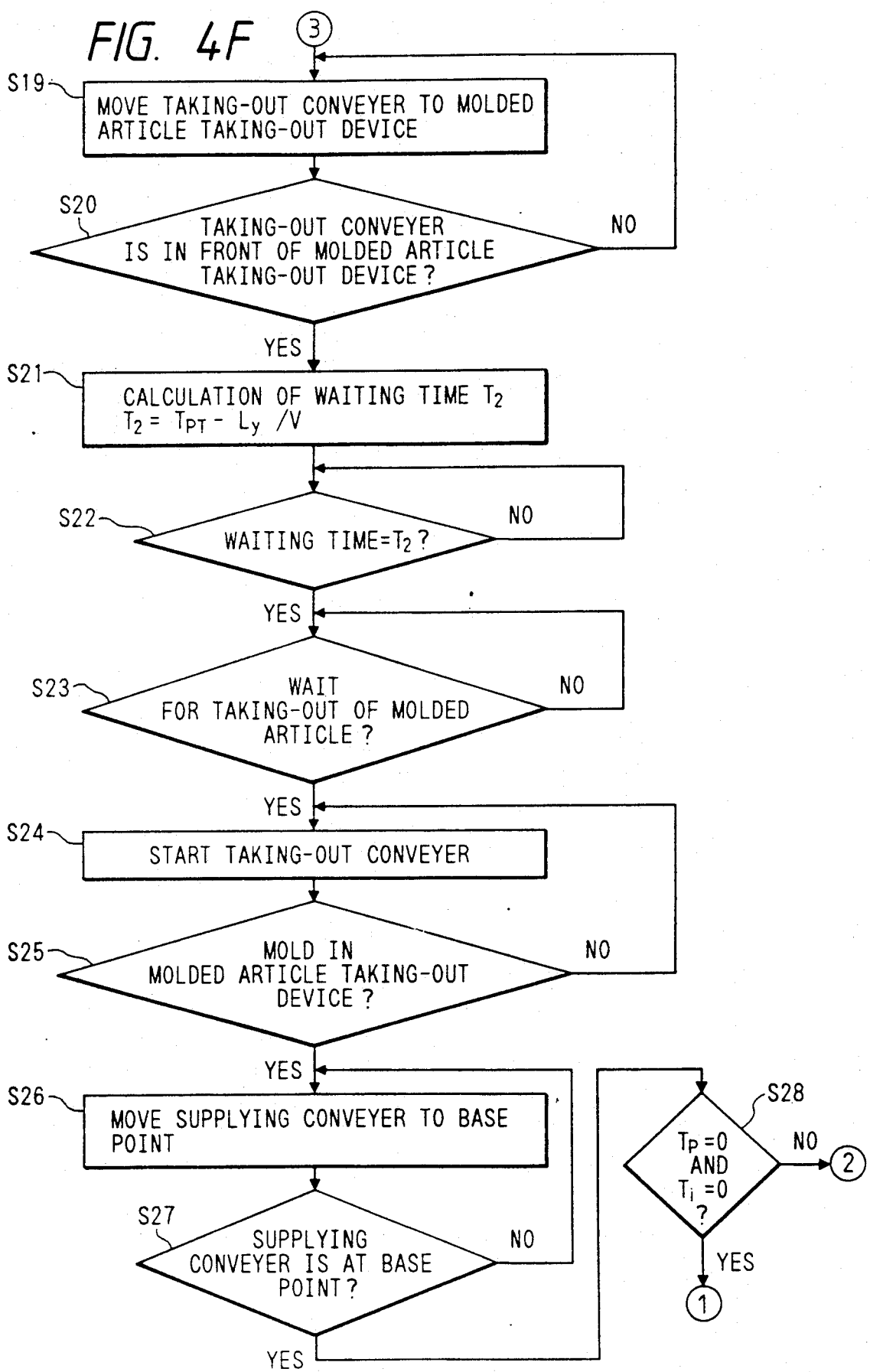

In the procedure shown in FIG. 4E, when the traverser 10 returns to the base point, there are discriminated the presence of mold in the discharging conveyor 12 (S41), the presence of mold in the charging conveyor 11 (S42) and the presence of mold in front of the charging conveyor 11, then the charging conveyor 11 is activated (S44) thereby placing the mold in the charging conveyor (S45).

Then, as in the waiting time control, a press unit to which the traverser 10 should move is selected (S46).

At the same time the speed of the traverser 10 is set and instructed thereto (S47). The transporting speed $V_{SP}$ of said traverser 10 is calculated in speed calculating means B11 of the central control panel 17 according to an equation:

$$V_{SP} = L_x/(T_{SP} - T_h - T_i) \qquad \text{(FIG. 3A, B1)}$$

and is supplied to the traverser controller 22, which drives the traverser 10.

Then the traverser 10 moves to the selected pressure unit with the instructed speed (S48), and stops in such a manner that the discharging conveyor 12 matches the conveyor path 14 of the press unit 18 (S49). Simultaneously with said stopping, the discharging conveyor 12 is activated to transfer the mold from the press unit 18 to said discharging conveyor 12 (S51). Then the traverser 10 is slightly moved in such a manner that the charging conveyor 11 matches the conveyor path 14 (S52, S53), and the mold in the charging conveyor 11 is transferred to the press unit (S54, S55). Then, according to whether the measured time in the pressurized cooling step is equal to the preset time or not, the central control panel 17 selects either a procedure shown in FIG. 4F or that shown in FIG. 4G (S56). More specifically, the sequence shown in FIG. 4G or that shown in FIG. 4F is selected respectively when a delay time $T_P$ is generated or not in the foregoing calculation in the cooling step.

In the sequence shown in FIG. 4F, when the presence of a mold in the press unit 18 is confirmed, the traverser 10 is moved to the molded article removing unit 15 and is stopped in such a manner that the discharging conveyor 12 matches the conveyor path of the removing unit 15 (S19, S20).

The traverser 10 is made to wait for a predetermined period in this state, by the instruction of the traverser controller 22 (S22). This waiting time $T_2$ is calculated by second waiting time control means B10 of the central control panel 17 according to the following equation (S21):

$$T_2 = T_{PT} - L_y/V \qquad \text{(FIG. 3A, B10)}$$

and is supplied to the traverser controller 22, which thus causes the traverser 10 to wait in front of the removing unit 15 for the waiting time $T_2$ (S23).

After said waiting time, the discharging conveyor 12 is activated to transfer the mold from said conveyor 12 to the removing unit 15 (S24).

After the confirmation of presence of the mold in the removing unit 15 (S25), the traverser 10 is moved to the base point 13 and stopped in such a manner that the charging conveyor matches the conveyor path 5 (S26, S27). Then the central control panel 17 selects the sequence shown in FIG. 4D if the measured heating time in the temperature elevating step is equal to the preset heating time and if the measured transporting time from the temperature elevating step to the injection molding step is equal to the preset time, or to the sequence shown in FIG. 4F if otherwise (S28).

In the sequence shown in FIG. 4G, the transporting speed of the traverser 10 from the press unit 18 to the molded article removing unit 15 is calculated, in the central control panel 17, by the following equation (S57):

$$V_{PT} = L_y/(T_{PT} - T_P) \qquad \text{(FIG. 3A, B12)}$$

and is supplied to the traverser controller 22, which thus moves the traverser 10 from the press unit 18 to the molded article removing unit 15 with the speed $V_{PT}$ (S56).

Thus the traverser 10 moves to the removing unit 15 with the instructed speed (S58), and stops in such a manner that the discharging conveyor 12 matches the conveyor path 16 of the removing unit 15 (S59). It is confirmed that the removing unit 15 is not in operation, and, simultaneous with the stopping of the traverser, the discharging conveyor 12 is activated to transfer the mold from said conveyor 12 to the removing unit 15 (S60, S61).

The traverser with both charging conveyor 11 and discharging conveyor 12 emptied is returned to the base point 13 (S62) and is stopped in a state in which the charging conveyor 11 is aligned with the base point 13 (S63). Then the central control panel 17 selects the sequence shown in FIG. 4D if the measured heating time in the temperature elevating step is equal to the preset heating time and if the measured transporting time from the temperature elevating step to the injection molding step is equal to the present time, or the sequence shown in FIG. 4F if otherwise (S64).

In the present embodiment the traverse device is composed of rails and a traverser, but there may be employed other structures, such as a traverse guided on a flat path instead of rails. The use of traverser is not limited to linear movement of the molds but also is applicable for moving the molds along the press units arranged in an arc shape or the like.

Also in the present embodiment, heating is conducted with a heater plate, but there may be employed other various types such as a thermostat.

As explained in the foregoing, the present invention provides the following advantages.

In a molding process in which plural molds are transferred in succession through a temperature elevating step, an injection molding step, a pressurized cooling step and a molded article removing step, information on the state of the molds, for example in the heating or cooling state thereof, is entered, and the control is made according to said information so as to vary the speed of transfer means for transferring the molds or to cause the mold to wait, through comparison of said information on the molds with predetermined information by means of comparator means. For this purpose, according to the present invention, there are provided transfer means for transferring the molds between different steps, and discrimination means for selecting either the transfer speed of said molds or the waiting time of said molds, wherein the transfer of said molds is controlled by said discrimination means.

It is therefore possible to securely control the temperature of the molds in each step and to operate the molding system smoothly without stagnation in the plural molds present in the system, thereby ensuring a high precision and a high productivity based on stabilized molding conditions.

In a molding system with plural molds, said molds are heated to a predetermined temperature in a temperature elevating step for eliminating the differences, among different molds, in temperature characteristics. In order to prevent the stagnation of the molds in such heating operation, according to the present invention, there are provided first time measuring means for measuring the heating time of the mold in the temperature elevating step: control means for setting a heating time determined in advance corresponding to the article to be molded; and first comparator means for comparing the signal of said time measuring means with the signal from said control means, and the transfer of said mold is controlled either by the waiting time or by the transfer speed according to the result of comparison by said first comparator means. Thus the difference in heating time among difference molds is compensated, and the stagnation of molds in the molding system can be prevented.

It is therefore possible to securely heat the molds to the predetermined temperature by heating each mold under temperature measurement, thereby achieving uniform and precise holding with plural molds. Thus the molds can be transferred as previously scheduled in the molding system, and smooth operation thereof can be achieved.

Also in order to prevent the stagnation of molds resulting from the fluctuation in the heating time of the molds, in the course of transfer of the molds from the temperature elevating step to the injection molding step, according to the present invention, there are provided temperature measuring means for measuring the temperature of said mold in the course of or after said transfer, control means for setting a predetermined temperature elevating time of said mold in the course from said temperature elevating step to said injection molding step, and comparator means for comparing the signals from said time measuring means and from said control means, and the transfer of said mold is controlled either by the waiting time or by the transfer speed, according to the result of comparison by said comparator means. It is therefore possible to transfer the molds, heated to a uniform temperature to the injection molding step, and to prevent the stagnation of the molds in the molding system.

Consequently the injection molding can be made under uniform temperature conditions to enable formation of precise molded articles without fluctuation, and still the molding system can be smoothly operated without stagnation in the transfer of the molds.

Also in order to prevent the stagnation of the molds resulting from the different in cooling speed of the molds cooled in plural press units, according to the present invention, there are provided a traverser for transferring the molds from the cooling units to the molded article removing step; time measuring means for measuring the cooling time of the molds in the pressurized cooling step; control means for setting the predetermined cooling time for the molds in said pressurized cooling step; and comparator means for comparing the signal of said time measuring means with that of said control means, and the movement of said traverser is controlled either by the waiting time or by the moving speed, according to the result of comparison by said comparator means. Consequently excess or shortage in the cooling time in the cooling step with respect to the preset cooling time can be compensated by the control of said traverser with the waiting time or the moving speed thereof.

Consequently the cooling step can be conducted with the preset schedule, to achieve high precise molding without fluctuation. Also the molding system can be smoothly operated without stagnation in the flow of the molds.

Also the system of the present invention, being provided with first transfer means for transferring the molds form the injection molding step to a predetermined position in the pressurized cooling step; a traverser for receiving the molds from said first transfer means and transferring said molds to cooling units in said pressurized cooling step; means for driving said traverser; means for detecting the presence of a mold in said first transfer means and in said traverser; and control means for driving said drive means in response to the signal from said detection means, is capable of secure loading of the mold into traverser without double loading thereby preventing dropping or breakage of the molds. Consequently the transfer from the injection molding step to the pressurized cooling step can be securely conducted, and the reliability of the molding system is improved.

Also in the pressurized cooling step, the cooling speed on the molds accommodated in plural cooling units may not be same as scheduled in advance, depending on the circulating condition of the cooling medium. However, according to the present invention, there are provided means for supplying each cooling unit with cooling medium; means for detecting the temperature of the mold set in each cooling unit; means for measuring the cooling time of the mold set in each cooling unit; means for memorizing the preset cooling time and temperature for the mold; and control means for switching the temperature of said cooling medium, and the temperature and cooling time of the mold in each cooling unit are compared with those predetermined in said memory means, and the temperature of the cooling medium to each mold is switched according to the result of said comparison. Consequently each mold can be cooled, in each cooling unit, to the predetermined temperature in the predetermined time.

Thus the difference in the cooling speed of the different molds in the cooling step can be compensated, and smooth flow of the mold in the molding system is ensured.

Also in relation to the means for transferring plural molds from the cooling step to the molded article removing step, according to the present invention there are provided means for detecting the cooling temperature of each cooling unit; means for measuring the cooling time of the mold in each cooling unit; means for memorizing a cooling curve, indicating a temperature corresponding to the cooling time adapted for the article to be injection molded; control means for discharging the molds from said plural cooling unit, by receiving the information of said memory means and the signals on the cooling time and temperature of the mold in each cooling unit, determining the mold for which the cooling is completed among plural cooling units, and releasing an extraction signal; and traverse means for transferring said molds between said pressurized cooling step and said molded article removing step, and comprising means for controlling a traverser for transferring said molds, wherein said control means is adapted to move said traverser to the position of a cooling unit containing the already cooled mold, in response to said extraction signal from said discharge control means.

Consequently the cooling can be conducted in optimum conditions along a cooling curve corresponding to a cooling time matching the article to be molded, so that the molded articles can be obtained with high precision without fluctuation and without defects. Also the mold which has been cooled fastest is at first transferred from the cooling unit to the molded article removing process, so that the smooth flow in the molding system can be ensured without loss in time and without overcooling.

Consequently it is possible to securely control the temperature of the molds in each step and to operate the molding system smoothly without stagnation in the flow of plural molds present in the system, thereby ensuring high precision and productivity resulting from stabilized molding conditions.

2) Heating unit

In the following there will be given an explanation on the heating unit 6 in the temperature elevating step A, with reference to FIGS. 5 to 8.

As shown in FIG. 6, the mold employed in the present embodiment is substantially rectangular, and is composed of an upper mold base plate 101, an upper mold plate 102, a lower mold plate 103, a lower mold receiving plate 104, and a lower mold base plate 105. Grip portions 106 are provided along longitudinal lateral ridges of the upper mold base plate 101 and the lower mold base plate 105. At the approximate center of the upper mold base plate 101 there is provided a runner 107 for introducing resin into the cavity. The mold 108 of the present embodiment can be opened between the upper mold plate 102 and the lower mold plate 103, and a cavity defining the form of the molded article is formed at the approximate center of the contact face between the upper mold plate 102 and the lower one 103 (cavity not shown). The upper mold base plate 101 and the upper mold plate 102 are integrally adhered to constitute the upper mold 109, while the lower mold plate 103, lower mold receiving plate 104 and lower mold base plate 105 are integrally adhered to constitute the lower mold 110. The removal of the molded article in the removing step is conducted by opening the mold 108, by mutually separating the grip portions 106 of the upper mold 109 and of the lower mold 110. On lateral faces 111 of the mold 108, not provided with the grip portions 106, there are provided receptacles 112 for connecting, for example, thermocouples embedded in the mold 108 for temperature measurement of the cavity, with external circuits.

The structure of the heating unit employed in the present embodiment will be explained in the following with reference to FIG. 5.

The heating unit 6 of the present embodiment is provided, in a chamber 116 for the mold 108, with lateral heater plates 117, 118 movable in lateral directions, upper and lower heater plates 119, 120 movable in the vertical directions, and guide members 121, 122 for guiding and supporting grip portions 106 of the upper mold 109 of the mold 108.

The chamber 116 is composed of lateral and rear walls 123, 124, 142, a ceiling 130 and a floor 131 but is open in the front, but there may be provided a door or the like in front in order to prevent the leakage of heat generated in said chamber 116.

The lateral heater plates 117, 118 are respectively mounted on piston shafts 127, 128 of air cylinders 125, 126 symmetrically fixed on the lateral walls 123, 124 of the chamber 116, and are movable in the axial direction of said shaft 127, 128 by the actuation of said air cylinders 125, 126. The heater plates 117, 118 have such vertical dimension as to substantially cover the height of the lateral faces 113, bearing the grip portions 106, of the mold 108, except however a portion required by the guide member 121, 122 for guiding said grip portions 106 of the upper mold 109 (see FIGS. 78 and C), and have a length substantially equal to the longitudinal dimension of the mold 108. The heater plates 117, 118 are provided with holes 129 for mounting heaters.

The upper and lower heater plates 119, 120 are respectively mounted on piston shafts 134, 135 of air cylinders 132, 133 mounted symmetrically on the ceiling 130 and floor 131 of the chamber 116, and are rendered movable in the axial direction of said piston shafts 134, 135 by the actuation of the air cylinders 132, 133. The heater plates 119, 120 have a lateral width substantially covering the transversal dimension of the mold 108 (see FIGS. 78 and C), and have a length substantially equal to the longitudinal dimension of the mold 108. The heater plates 119, 120 are provided, like the heater plates 117, 118, with holes 129 for mounting the heaters.

The guide members 121, 122 are supported by support members 136 mounted on the ceiling 130, at a position corresponding to the grip portions 106 of the upper mold 109 and the mold 108 is loaded in the chamber 116. The guide members 121, 122 are mutually separated by a distance substantially equal to the transversal dimension of the mold 108. The guide members 121, 122 are provided, along the longitudinal direction, with lower rollers 139 for guiding the lower faces 137 of the grip portions 106 and lateral rollers 140 for guiding the lateral faces 138 of said grip portions 106. Said lower rollers 139 are driven by an unrepresented drive mechanism. The guide members 121, 122 have a length substantially equal to or larger than the longitudinal dimension of the mold 108.

Instruments 104 provided in the upper part of the heating unit indicate the temperatures of the cavity of the mold 108 and of the heater plates 117, 118, 119, 120 and are used for inspecting the temperature of the cavity of the mold 108.

In the following there will be explained the function of the present embodiment, with reference to FIGS. 5 and 7.

Figure 7A:
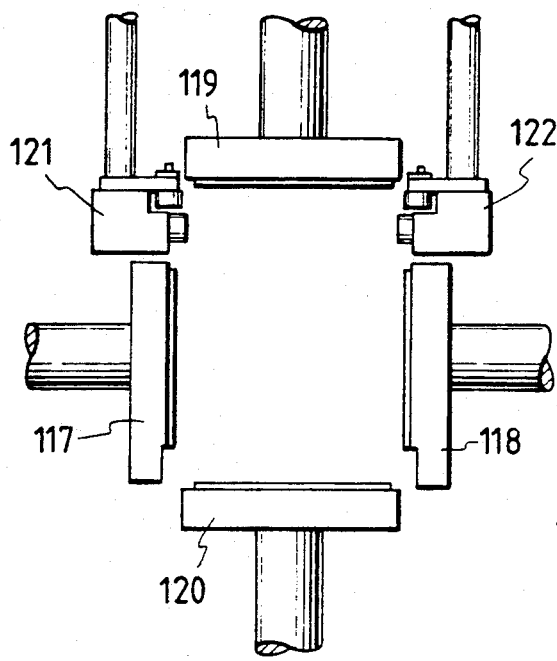
FIGS. 7A, 7B and 7C are schematic views showing function.

At first the lateral heater plates 117, 118 and upper and lower heater plates 119, 120 are mutually opened to enable loading of the mold 108 into a space defined by said heater plates (FIG. 7A). The heater plates 117, 118, 119, 120 are heated in advance by supply of electric current to the heaters.

Then the mold 108 is loaded into the chamber 116, with the grip portions 106 of the upper mold 109 being guided by the guide members 121, 122. More specifically, the mold 108 is loaded into a space defined by the heater plates 117, 118, 119, 120, while the lower faces 137 of said grip portions 106 are vertically defined by the lower rollers 139 and the lateral faces 138 are horizontally defined by the lateral rollers 140 (see FIG. 7B). Simultaneously with said loading, the receptacles 112 on the rear face 111 of the mold are automatically connected with plugs provided on the heating unit 6 for effecting, for example the temperature measurement of the cavity.

Then the air cylinders 125, 126, 132, 133 are activated to bring the heater plates 117, 118, 119, 120 into contact with the upper, lower and lateral faces of the mold 108 (FIG. 7E). Thus the mold 108 is heated to a predetermined temperature by heat conduction from said heater plates to the mold 108.

After said heating, said heater plates are separated from the mold 108 (state shown in FIG. 7B), and the mold 108 is transferred from the heating unit 6 to the injection molding step.

In the present embodiment, the structure for loading the mold 108 into the heating unit 6 and supporting said mold in said heating can be simplified, since the guide members 121, 122 are used for guiding the grip members 106 in loading and for supporting the mold 108 in the temperature elevating step.

Also the mold 108 provides a large surface area for contact with the heater plates, as only the grip portions 106 of the upper mold 109 and the vicinity thereof are needed for supporting. In the present embodiment, the upper and lower faces and the lateral faces 113 bearing the grip portions 106 are almost entirely available for contact with the heater plates to enable rapid heating in the temperature elevating step.

In the present embodiment, the lateral faces 111 not bearing the grip portion 106 are not used for contact with the heater plates, but there may be employed a structure for contacting heater plates also on said lateral faces 111 to further improve the heating efficiency of the mold.

Also instead of the guiding/supporting structure for the grip portions of the upper mold 109 employed in the present embodiment, there may be employed a structure for guiding and supporting the grip portions of the lower mold 110 (see FIG. 9).

The guide members 121, 122 have plural lower rollers 139 and plural lateral rollers 140 for respectively supporting the lower faces 137 and lateral faces 138 of the grip portions 106, but there are other various structures of the guide members for guiding and supporting the grip portions.

Also the temperature controlling members for contacting the surfaces of the mold and heating the same are not limited to the aforementioned heater plates but can assume various types, such as plates with embedded steam pipes.

In the following explained is a second embodiment of the present invention with reference to FIG. 8 which is an external perspective view of the mold and FIG. 9 showing the heating process of the present embodiment.

The mold employed in the present embodiment is same as that shown in FIG. 6 except that heat insulating members are provided between the upper mold base plate 101 and the upper mold plate 102, and between the lower mold plate 103 and the lower mold receiving plate 104.

The heat insulating members 146, 147 are respectively provided over the entire area between the upper mold base plate 101 and the upper mold plate 102, and between the lower mold plate 103 and the lower mold receiving plate 104 for hindering the heat transfer therebetween. Consequently the upper and lower mold plates 102, 103, bearing pieces 149 defining the cavity 148 are thermally independent from the remaining members of the mold 108, namely the upper mold base plate 101, lower mold receiving plate 104 and lower mold base plate 105 (see FIGS. 9B and C). Said heat insulation members 146, 147 are preferably composed of a material of a low heat conduction and a high compression strength, such as high-molecular plastics, bakelite, asbestos or ceramics. The upper and lower mold plates 102, 103 can be composed of a copper alloy, pure copper or a precious metal for improving the heat conduction.

Figure 5:
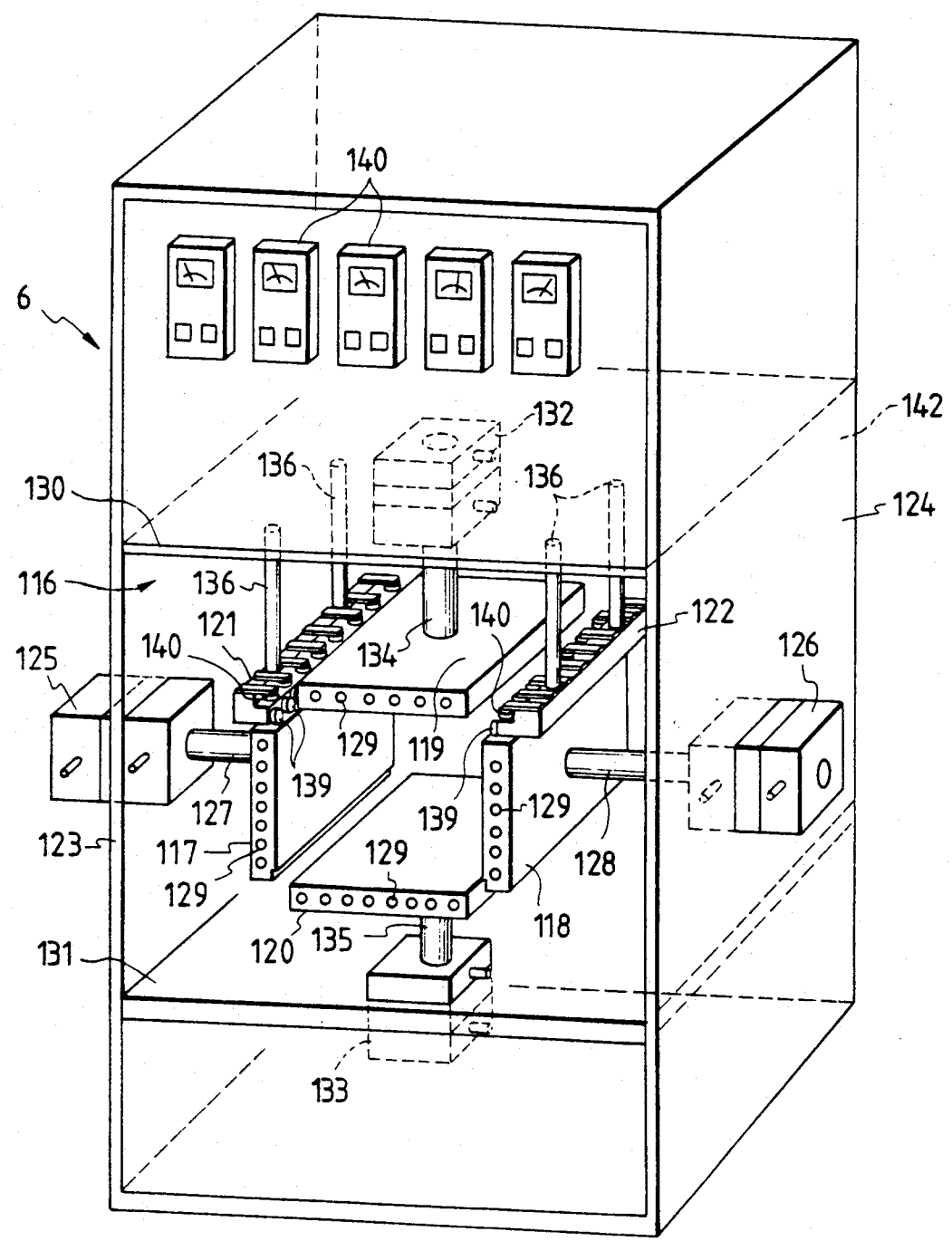

The heating unit 6 of the present embodiment is provided with a chamber 116 for accommodating the mold, and, in the upper part, with instruments 140 for inspecting the cavity temperature, as in the first embodiment shown in FIG. 5, though the entire view is omitted. In the chamber 116, there are provided, as shown in FIG. 9, lateral heater plates 152, 153 for contact with the lateral faces 113, bearing the grip portions 106, of the mold 145, and guide members 150, 151 for guiding and supporting the grip portions 106 of the lower mold 110.

Said heater plates 152, 153 are positioned corresponding to the upper and lower mold plates 102, 103 of the mold 108 and have a height substantially equal to that of said mold plates 102, 103. Their length is substantially equal to the longitudinal dimension of the mold 145. As in FIG. 5, the heater plates 152, 153 are respectively mounted on piston shafts 154, 155 of air cylinders mounted on lateral walls of the chamber.

The guide members 150, 151 are supported by support members 160 fixed on the floor, at a position corresponding to the grip portions 106 of the lower mold 110 of the mold 145 loaded in the chamber, and are mutually spaced by a distance substantially corresponding to the transversal width of the mold 145. The guide members 150, 151 are provided, along the longitudinal direction thereof, with plural lower rollers 158 for guiding the lower faces 156 of the grip portions 106 and plural lateral rollers 159 for guiding the lateral faces 157 of said grip portions 106, wherein said lower rollers 158 are driven by an unrepresented drive mechanism. The length of the guide members 150, 151 is substantially equal to or larger than the longitudinal dimension of the mold 145.

Figure 9A:
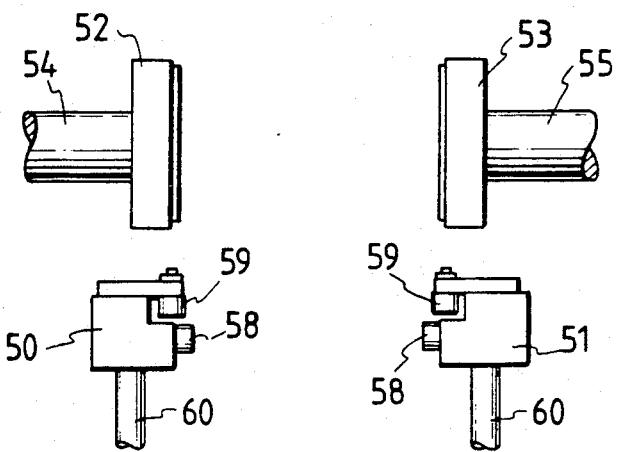
FIGS. 9A, 9B and 9C are schematic views showing the function of the second embodiment.

The function of the present embodiment is as follows. At first, as in the first embodiment, the lateral heater plates 152, 153 are mutually opened to enable loading of the mold 145 therebetween (FIG. 9A). The heater plates 152, 153 are heated in advance by current supply to the incorporated heaters.

Figure 9B:
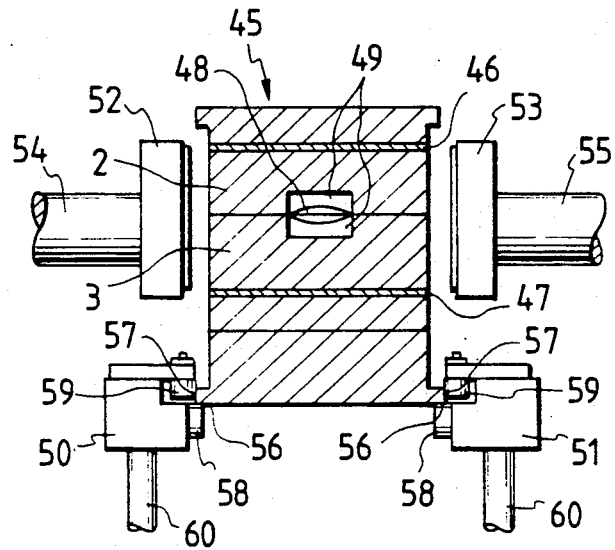

Then the mold 145 is inserted between the heater plates 152, 153 while the grip portions 106 of the lower mold 110 are guided by the guide members 150, 151. More specifically, at said insertion, the lower faces 156 of the grip portions of the lower mold 110 are guided by the lower rollers 158 for defining the vertical position, while the lateral faces 157 are guided by the lateral rollers 159 for defining the lateral position (FIG. 9B).

Figure 9C:
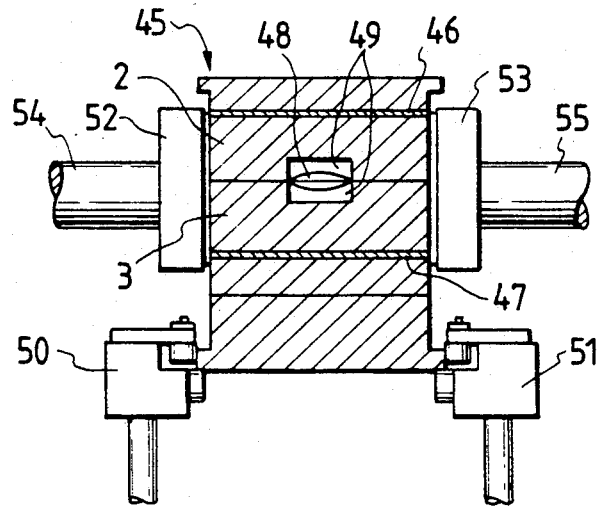

Then the air cylinders are activated to bring the heater plates 152, 153 into contact with the upper and lower mold plates 102, 103, on the lateral faces 113 bearing the grip portions (FIG. 9C). Thus the upper and lower mold plates 102, 103 are heated to a predetermined temperature by heat conduction thereto from the heater plates 152, 153.

After said heating, the heater plates 152, 153 are separated from the mold 145 (FIG. 9B), and the mold 145 is transferred from the heating unit of the present embodiment to the injection molding step.

The present embodiment, in which the upper and lower mold plates 102, 103 are made thermally independent from other parts of the mold 145 by heat insulation members provided between the upper mold base plate 101 and the upper mold plate 102 and between the lower mold plate 103 and the lower mold receiving plate 104, has a smaller volume to be heated, and can therefore achieve heating in a shorter time with a reduced energy.

In the present embodiment the heater plates are not provided corresponding to the lateral faces 111, not bearing the grip portions 106, of the mold 145, but the efficiency of heating can be further improved by contacting heater plates on such lateral faces 111 also.

In the present embodiment, the mold 145 is supported and guided by the grip portions 106 in cooperation with the guide members 150, 151, but it is also possible to employ a conveyor with rollers for loading the mold 145 into the heating unit and for supporting said mold therein, since heat conduction in the present embodiment is not made from the lower face but only from the lateral faces due to the presence of heat insulation members above and below the mold plates 102, 103.

The heating unit of the present embodiment is capable of precise temperature control of the mold through heat conduction from the temperature control members brought into contact with the surface of the mold, and has a high heating efficiency since the heat of said temperature control members can be directly transmitted to the mold. Also the absence of heaters embedded in the mold dispenses with the step of connecting such heaters with external power source, thus avoiding the danger of shortcircuiting or the like.

Also the use of grip portions, provided along end ridges of the upper or lower mold, for guiding and supporting with the guide members provides an enlarged surface area available for contact with the temperature control members.

Furthermore the presence of heat insulation members above and below the cavity pieces for forming a structure thermal independent to the upper and lower surfaces, combined with thermal conduction from the lateral faces of the mold, reduces the volume to be heated in the mold, thus enabling heating within a shorter time with a reduced amount of energy.

Figure 10:
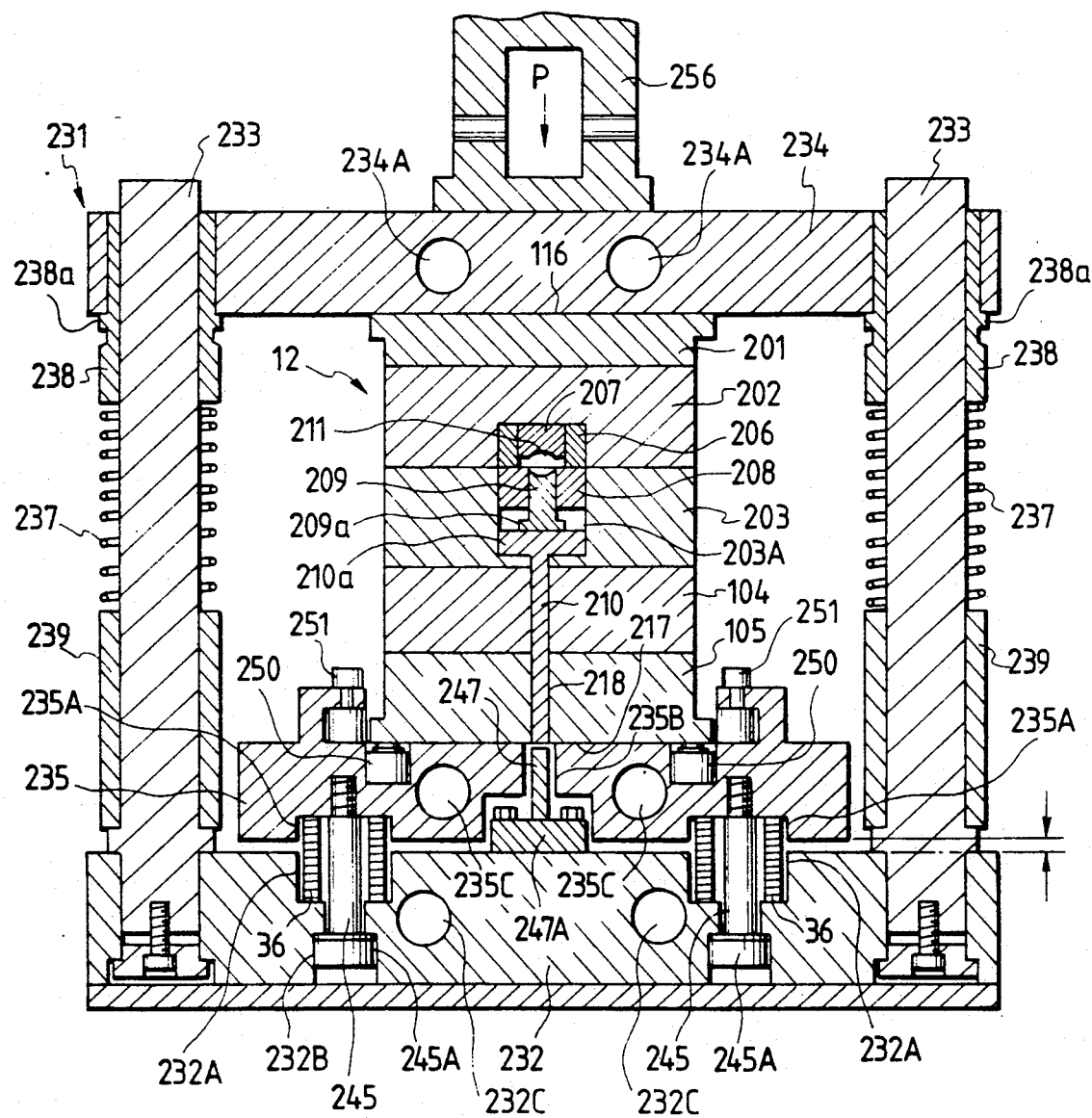
FIG. 10 is a cross-sectional view of a press cooling unit employed in the pressurized cooling step of the present invention.

3) Pressurized cooling means structure of the pressurized cooling unit shown in FIG. 1, wherein FIG. 10 is a cross-sectional view of a press unit 231 loaded with a mold (101-105).

3-1) Mold 12

FIG. 10 shows the cross section of the mold 12, corresponding to a line I—I in FIG. 3.

In FIG. 10 there are shown a first side mounting plate 201; a mold plate 202; a second side mold plate 203; a second side receiving plate 204; a second side mounting plate 205; fixed pieces 206, 207, 208; a movable piece 209; a first compression rod 210; and a cavity 211. The mold 12 can be opened at the boundary between the first and second sides.

The first side surface of the cavity is composed of the first side fixed pieces 206, 207, and has a concave form. The first side fixed piece 206 is cylindrical, into which the first side fixed piece 207 is fitted to constitute the first side portion of the cavity. Said fixed pieces 206, 207 are mounted on the first side mold plate 102. The first side surface of the cavity 211 does not move.

The second side surface of the cavity 211 is composed of the second side fixed piece 208 and the movable piece 209. The cavity is of a lens form thicker in the center. The movable piece 209 constitutes the lower cavity surface corresponding to the thicker center, and is therefore concave. The second side fixed piece 208 is cylindrical, surrounding the movable piece 209 and is mounted on the second side mold plate 203, while the movable piece 309 is slidable with respect to said fixed piece 208. However the external surface of the movable piece 209 and the internal surface of the fixed piece 208 are so precisely finished as to obtain a clearance in the order of 1-5 microns therebetween, in order to prevent resin leaking. The movable piece 209 is provided, at the lower part thereof, with a flange 209a which impinges on the fixed piece 208 for avoiding extraction of the movable piece 209 upwards. When a second temperature control plate 235 is brought into contact with a base member 232 as will be explained later, the contour of the surfaces constituting the cavity of the movable piece 209 coincides with the internal contour of the upper surface of the fixed piece 208.

The lower face of the movable piece 209 is maintained in contact with the first compression rod 210, which extends downwards slidably along a hole 218 provided in the second mold plate, receiving plate and mounting plate 203, 204, 205 and is left free at the lower end to the exterior of the mold. Since the hole 218 is only to enable vertical movement of the first compression rod 210, precise finishing as in the engagement between the movable piece 209 and the fixed piece 208 is not required between the internal surface of the hole 218 and the external surface of the first compression rod 210. A flange 210a is provided at the upper end of the first compression rod 210. The fixed piece 208, movable piece 209 and flange 210a of the first compression rod are positioned in a hole 203A of the second side mold plate 203, and the depth of said hole 203A is made larger than the sum of the height of the cylindrical fixed piece 208, that of the flange 209a of the movable piece 209, that of the flange 210a of the first compression rod 210 and the movable distance of the movable piece 209. The engagement of the flange 210a of the first compression rod with the bottom of the hole 203A limits downward movement of the rod 210, and that of the movable piece 209. The length of the first compression rod 210 is so determined that it does not protrude from the lower face of the second side mounting plate 105 at the lowermost position of said rod.

3-2) Press unit 231

Figure 11:
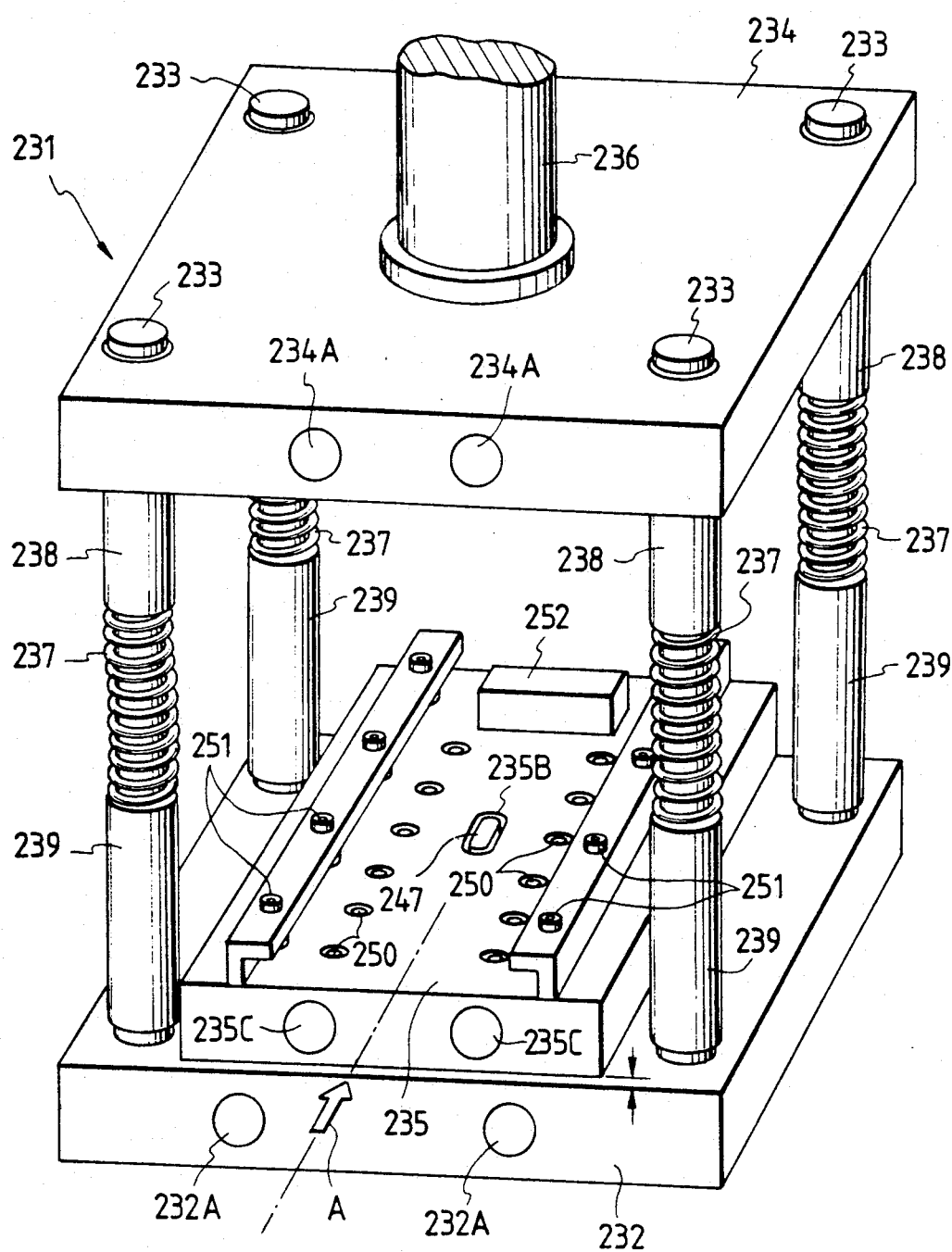
FIG. 11 is an external view of a press unit in the embodiment shown in FIG. 10.

FIG. 11 is an external view of the press unit 231.

As shown in FIGS. 10 and 11, the press unit 231 is provided with a base member 232 with four guide posts 233, on which a first temperature control plate 234 is slidably fitted. A second temperature control plate 235 is fixed on said base member 232. On the first temperature control plate 234 a press cylinder 256 is mounted or maintained in contact.

On each guide post 233 there is fitted a coil spring 237, sandwiched between a first collar 238 and a second collar 239. The first temperature control plate 234 is fitted on said first collars 238 and supported by flanges 238a thereof. Thus, when pressed downwards by the cylinder 256, the first temperature control plate 234 and the first collars 238 descend along the guide posts 233 against the force of the coil springs 237. When the press cylinder 256 is deactivated, the first temperature control plate 234 and the first collars 238 move upwards and return to the original position by the force of the coil springs 237.

The first temperature control plate 234 is provided with holes 234A for circulation of gaseous or liquid cooling medium.

The second temperature control plate 235 is supported by coil springs 236 above the base member 232. In total, four coil springs 236 are provided in symmetric positions of the second temperature control plate 235. and each spring extends over holes 231A, 232A formed, with certain depths on the second temperature control plate 235 and the base member 232. Bolts 245 with heads 245A are screwed into the second temperature control plate 235, with said heads 245A positioned in holes 232B formed on the base member 232. The force of the coil springs 236 is so selected that a certain gap h is formed between the base member 232 and the second temperature control plate 235 under the weight thereof only.

In the second temperature control plate 235 there is accommodated a second compression rod 247 of such shape and cross section that it can enter the hole 218 for guiding the first compression rod 210. Said second compression rod 247 is expanded at a base portion 247A which is fixed, with bolts, to the upper face of the base member 232. The second compression rod 247 is so positioned on the base member 232 as to be coaxial with the first compression rod 210 when the mold 12 is loaded. The second temperature control plate 235 is provided with a penetrating hole 235B of such form as to accommodate the second compression rod 247 and to enable movement thereof without contact with the control plate 235. Consequently the second temperature control plate 235 is movable relative to the second compression rod 247, and the height thereof is so determined that the upper end thereof is retracted from the upper face of the second temperature control plate 235 when it is lifted, but protrudes from said upper face when said control plate 235 is in contact with the base member 232.

The second temperature control plate 235 is further provided with two rows of spherical rollers 250 supported by springs, for facilitating the insertion of the mold 12 in a direction A in such a manner that said rollers do not sink completely by the weight of the mold at the insertion thereof. When pressed by the press cylinder 256, the bottom of the mold 12 is brought into contact with the upper face of the second temperature control plate 235.

When the bottom of the mold 12 and the upper face of the second temperature control plate 235, and the lower face thereof and the upper face of the base member 232 are brought into mutual contact under the pressure of the press cylinder 256 as will be explained later, the movable piece 9 is pressed by the second and first compression rods 247, 210 and is pushed upwards. The lengths of the second and first compression rods 247, 210 and the movable piece 209 are so determined that the contour of the cavity defining surface of the movable piece 209 coincides with the internal contour of the upper surface of the fixed piece 208 in such state.

The second temperature control plate 235 is further provided, as lateral guides, with two rows of guide rollers 251, for the insertion of the mold 12 in the direction A. In a rear portion of said plate 235 there is provided a block member 252 for stopping the mold 12 inserted in the direction A.

As in the first temperature control plate, the second temperature control plate 235 is provided with holes 235c for circulating the liquid or gaseous cooling medium.

In the present embodiment, similar holes 232c are formed on the base member 232 for increasing the cooling ability for the mold 12.

In the following there will be explained the function of the pressurized cooling mechanism of the present embodiment.

After the injection of resin into the cavity 211 by the injection molder, the mold 12 is transferred, with the first compression rod downwards, to one of the press units 231, and introduced in the direction A. The rear face of the mold 12 impinges with the block member 252 whereby the mold 12 is mounted on the second temperature control plate 235 of the press unit 231, with the lateral position being defined by the guide rollers 251. In this state, the first and second compression rods 210, 247 are mutually coaxial. The gap of the second temperature control plate 235 decreases by the weight of the mold 12, but the initial gap h is so selected that the upper end of the second compression rod 247 does not protrude from the upper face of the second temperature control plate 235.

Then the press cylinder 256 is activated to move the first temperature control plate 234 downwards. Since cooling medium is circulated in the holes 234A, the heat of the mold 12 moves upwards to the first temperature control plate 234 when it is brought into contact with the upper face of the mold 12. Also, already when the mold 12 is mounted on the second temperature control plate 235, the heat of the mold 12 flows downwards to said second temperature control plate 235. Further action of the press cylinder brings the first temperature control plate 234 further downwards, whereby the spherical rollers 250 sink and the lower face of the mold 12 is brought into contact with the upper face of the second temperature control plate (as shown in FIG. 10). At the same time the gap between the second temperature control plate 235 and the base member 232 is reduced, whereby the upper end of the second compression rod 247 moves upwards relative to the second temperature control plate 235 and protrudes from the upper face thereof, thus entering in the guide hole 218 and engaging with the lower end of the first compression rod 210. Upon further descent of the first temperature control plate 234, the second compression rod 247 moves the first compression rod upwards relative to the mold 12, thereby moving the movable piece 209 upwards. When the gap becomes zero, namely when the lower face of the second temperature control plate 235 comes into contact with the upper face of the base member 232, the contour of the cavity defining face of the movable piece 209 coincides with the interval contour of the upper face of the fixed piece 208. The cooling of resin is conducted in this state, with elevated internal pressure of the cavity, thus preventing the molding sink and improving the transfer of the form of the cavity. Since the holes 235c for cooling medium are provided also in the base member 23, the mold 12 is further cooled by the base member 232 when it is brought into contact with the second temperature control plate 235.

When the molding is completed, the press cylinder 235 is deactivated, whereby the first temperature control plate 234 is pushed upwards by the returning force of the coil springs 237. Thus the second temperature control plate 235 is also lifted by the returning force of the coil springs 243, whereby the upper end of the second compression rod 247 is retracted from the upper face of the second temperature control plate 235. The movable piece 209 and the first compression rod 210 do not necessarily return to the lower position, but they are pushed downwards by the resin pressure at the injection molding. When the upper end of the compression rod comes lower than the upper surface of the second temperature control plate, then, the mold 12 is transferred from the press unit 231 to the molded article removing unit, in which the mold is opened and the molded article is removed. Thereafter the mold is closed again, and if transferred to the injection molding or to the heating step in the heating unit prior to the injection molding.

In the resin injection into the cavity 11 in the injection molder, the movable piece 209, or said piece 209 and the first compression rod 210 are pushed downwards by the resin pressure even if they have not returned to the lower position.

Thereafter the mold filled with resin is transferred to one of the cooling units as explained in the foregoing.

In the present embodiment, coil springs 236 are employed for lifting the second temperature control plate 235 from the base member 232, but there may be employed any other elastic members for this purpose, such as plate springs, rubber or plastics.

Also in the present embodiment the springs 236 and the second compression rod 247 are provided between the base member 232 and the temperature control plate 235 on which the mold is placed, but it is also possible to position a base member above the upper temperature control plate 234 and to provide springs and the second compression rod between said base member and temperature control plate 234, thereby effecting the pressurization from above.

In the pressurized cooling mechanism of the present invention, a temperature control plate is supported with springs in a floating state from the base member, and, in the descent of the mold by the press unit, the second compression rod fixed on said base member engages with the first compression rod provided in the mold, thereby displacing the movable piece and compressing the molded resin present in the cavity. It is therefore rendered possible to eliminate the generation of oil mist in the pressing of the first compression rod, and to dispense with the peripheral devices of the oil cylinder, such as oil pressure generator, valves and controls circuits therefor, thus reducing the cost of the apparatus.

The mold structure of the present invention, in which the movable piece is pressurized with the compression rod at the cooling in the press unit, allows to increase the internal pressure of resin in the cavity at such cooling, thereby preventing the molding sink and improving the transfer of form of the cavity surfaces. It also reduces the cooling time in the molding system, and, in the designing of a molding system, to reduce the number of press units, thereby decreasing the capital investment and the space required for installation.

Also since the pressing operation of said compression rod is conducted by suitable means provided in the press unit, the mold only requires the compression rod therein and can therefore be simplified in structure.

Furthermore, since the pressing operation of the movable piece is conducted by a compression rod which is separate from said movable piece, the movable and the fixed piece contacting therewith have to be finished with a high precision but the compression rod and the guiding hole therefor do not require such highly precise finishing. Consequently the mold can be manufactured easily. Also since the compression rod and the guiding hole therefor are not tightly fitted mutually, there is only required a limited force for pushing said compression rod and the movable piece upwards or downwards.

4) Improved mold

In the above-explained molding process and system, the mold is not provided therein with heating or cooling mechanism, and the heating and cooling of the cavity in the mold is achieved by heat conduction, under temperature control, by external heating and press units.

Consequently the heating or cooling of the cavity inevitably involves heating or cooling of other parts, resulting in a low efficiency and requiring additional energy.

Also, since the cavity is present at the center of the mold, the heating or cooling of the cavity takes place only after the heating or cooling of the remaining large volume of the mold, so that the rapid and precise temperature control of the cavity is difficult.

In consideration of the foregoing, there is provided a mold for plastic injection molding, enabling efficient heating and cooling of the cavity in a molding system and also enabling rapid and precise temperature control of the cavity.

Figure 13:
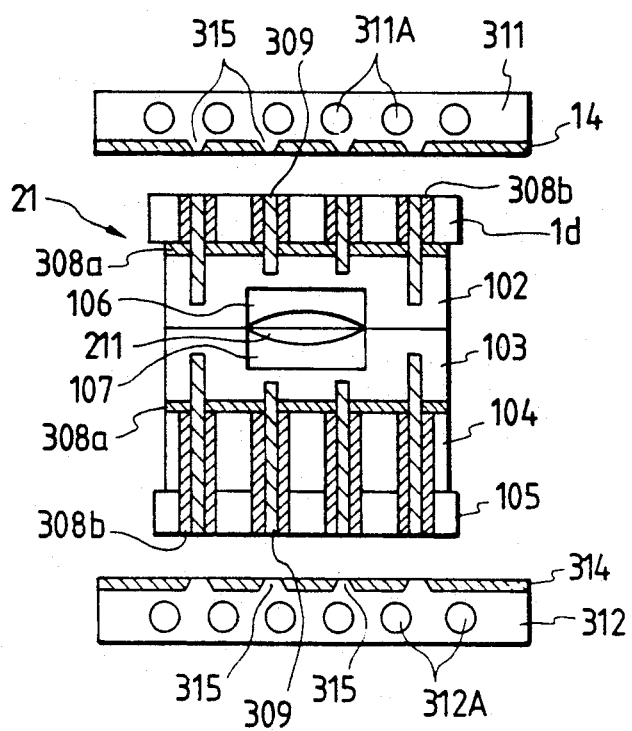
FIG. 13 is a cross-sectional view of an embodiment of a cooling mold.

FIG. 13 illustrates an embodiment of such improved mold, wherein same components as those is FIG. 10 are represented by same numbers.

In FIG. 13, the compression rod for pressurizing the mold is omitted.

In the present embodiment, the first side mounting plate 101 and the first side mold plate 102 are made thermally independent by a heat insulation member 308a provided therebetween, and the second side mold plate 103 and the second side receiving plate 104 are made thermally independent by a heat insulation member 308a provided therebetween. Consequently the first side fixed pieces 106, 107 are thermally insulated, together with the lates 102, 103, from other parts of the molds.

Heat transmission rods 109 of a certain diameter are inserted into the first side mold plate 102 from the first side mounting plate 101, and said rods 309 are exposed to the exterior and coplanar, at an end thereof with the end face of the mounting plate 101. Said rods 109 are surrounded by heat insulators 308b in order to prevent heat diffusion from the rods 309 into the mounting plate 101. Also in the second side of the mold, similar heat transmission rods 309 are inserted from the second side mounting plate 105 into the second side mold plate 103. The material, number and arrangement of the heat transmission rods 309 are determined experimentally or by computer simulation so as to achieve desired targets of efficiency and rapidity and preciseness of heating and cooling of the cavity 211. Also the depth of insertion of said rods 309 into the second side mold plate 103 is determined similarly. The heat transmission rods 309 are preferably composed of a material allowing rapid heat transmission, with thermal conductivity at least equal to 0.3 cal/cm.sec. °C., such as copper alloys, pure copper or precious metals.

First and second temperature control plates 311, 312 are covered with heat insulating material 314 on a face thereof coming into contact with the mounting plates 101, 105, except for the positions 315 coming into contact with the heat transmission rods 109, so that the heat transfer is conducted only through said positions 315, or between the temperature control plate 311 or 312 and the rods 309. The plates 311, 312 are provided with pipes 311A, 312A for cooling medium circulation.

The material of the first and second mold plates 102, 103 need not be same as that of the mounting plates 104, 105 and the receiving plate 104.

In case of heating the mold of the above-explained embodiment, the temperature control plates 311, 312 are respectively brought into contact with the mounting plates 101, 105, and the temperature control plates 311, 312 are heated for example by incorporated heaters. The heat thus generated is transmitted through uninsulated portions 315 to the rods 209, thus heating the first and second mold plates 102, 103 through said rods 309 and eventually heating the cavity 211. Cooling is also conducted in the same manner except that the direction of heat transmission is inverse.

Since the first and second mold plates 102, 103 are thermally insulated, by the heat insulator 308a, from the mounting plate 101 and the receiving plate 104, and also since the heat transmission rods 309 are covered by the heat insulators 308b in the places where said rods penetrate the mounting plates 101, 105 and receiving plate 104, the heat of the temperature control plates 311, 312 only moves to the mold plates 102, 103 through said rods 309, more quickly because of the presence of said rods 309. It is thus rendered possible to improve the heat efficiency for heating, and to achieve rapid heating and delicate temperature control. These apply also to the case of cooling.

Also since the rods 309 are provided in a necessary number, the strength of the members 101, 105, 104 etc. can be maintained even if said rods are not mechanically strong.

Though not shown in the present embodiment, the contact area between the rods 309 and the mold plates 102, 103 may be increased by a non-planar structure, such as screw engagement, in order to increase the heat transmission.

Figure 14:
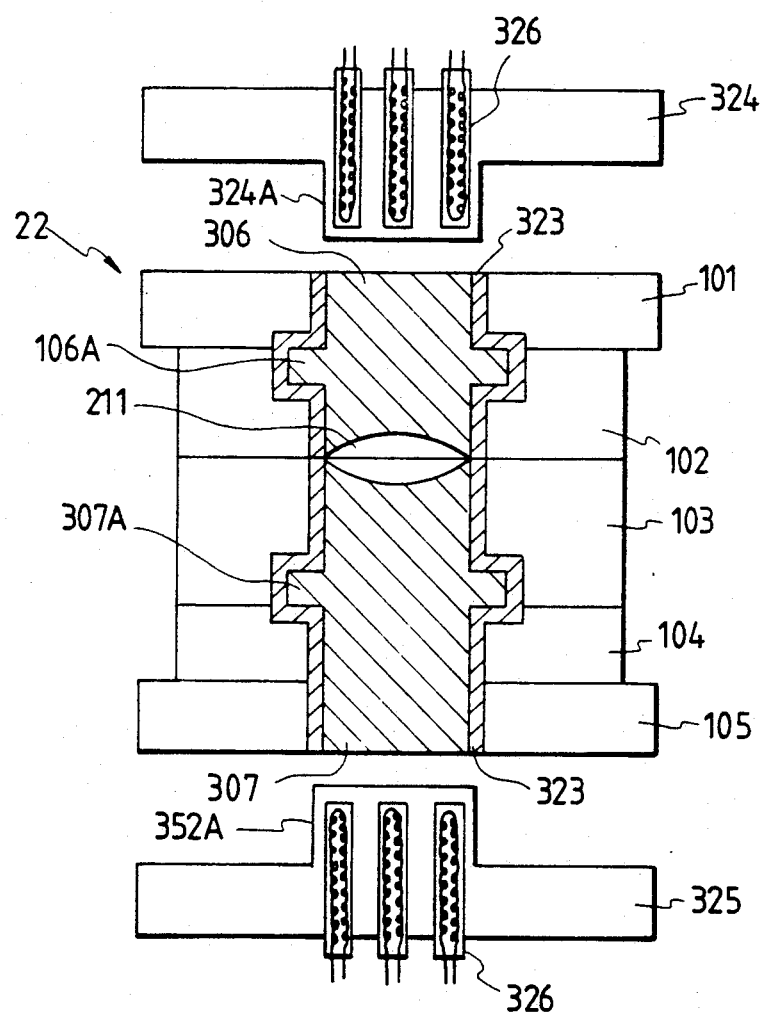
FIG. 14 is a partial cross-sectional view of another embodiment of a cooling mold.

FIG. 14 shows another embodiment of the mold of the present invention, wherein shown are a heat insulator 323; a fixed side temperature control plate 324; and a movable side temperature control plate 325. Said temperature control plates 324, 325 are for heating the mold, and are provided with heaters 326 embedded in the central protruding portions. For cooling the mold in the press unit, temperature control plates with holes for circulating the cooling medium (not shown) are employed instead of the plates 324, 325 shown in FIG. 14.

In the present embodiment, the first side fixed piece 306 is extended to the external face (upper face) of the first side mounting plate 101 and ends in co-planar manner with said external face. The fixed piece 106 is provided with an annular flange 106A placed between the first side mounting plate 101 and the mold plate 102, whereby the piece 306 is maintained in the vertical direction.

Also the piece 107 is extended through the second side receiving plate 104 to the external (lower) face of the second side mounting plate 105, and ends co-planarly with the external face of said mounting plate 105. An annular flange 307A is positioned between the second side mold plate 103 and the receiving plate 104 to fix the vertical position of the piece 306.

The pieces 306, 307 are covered by heat insulators 323 on the contact surfaces with other parts and are therefore thermally independent.

The material, cross section etc. of the pieces 306, 307 are determined experimentally or by computer simulation so as to achieve design targets such as efficiency of heating and cooling, rapidity thereof and detailed temperature control. The pieces 306, 307 are preferably composed of a material capable of rapid heat conduction with a thermal conductivity at least equal to 0.3 cal/cm.sec.° C., such as copper alloys, pure copper or precious metals.

The temperature control plates 324, 325 are provided with protruding portions 324A, 325A of a cross section same as that of the pieces 306, 307, thus corresponding to the externally exposed areas thereof, and heaters 326 of a predetermined number are embedded in said protruding portions 324A, 325A.

In heating the mold of the above-explained embodiment, the temperature control plates 324, 325 are so moved that the protruding portions 324A, 325A are maintained in contact with the externally exposed portions, on the mounting plates 101, 105, of the pieces 306, 307. Thus the heat of the heaters 326 is transmitted to the pieces 306, 307, thereby heating the cavity 211.

In this operation, the protruding portions 324A, 325A of the temperature control plates 324, 325 only contacts the externally exposed parts of the pieces 306, 307, so that the heat from the heaters 326 is solely transmitted to the pieces 306, 307.

It is therefore possible to improve the thermal efficiency of heating, thereby shortening the heating time and achieving delicate temperature control.

Cooling can be achieved in a similar manner. The protruding portions of the temperature control plates cooled with the cooling medium are maintained in contact with the externally exposed portions, on the mounting plates 101, 105, of the pieces 306, 307, whereby the heat of the cavity 211 is transmitted through the pieces 306, 307 to the temperature control plates. Since only the pieces 306, 307 are cooled by said plates, there is obtained a higher efficiency of cooling, which enables to reduce the cooling time and to achieve delicate temperature control.

In the present embodiment, the pieces 306, 307 are provided with heat insulators in the contact surface with other parts of the mold, but a similar effect can be obtained even without such heat insulators if the piece 306, 307 are composed of a material of higher thermal conductivity in comparison with other parts of the mold, since, as the pieces 306, 307 effect a larger amount of heat transfer, thus achieving faster heating and cooling.

The heat insulators of the present invention can be composed, for example, of ceramics, bakelite, asbestos or high-molecular plastics.

The mold of the present invention for plastic injection molding, so constructed as to heat or cool only the vicinity of the cavity, provides an improve efficiency for heating or cooling, thereby enabling rapid and delicate temperature control of the cavity.

What is claimed is:

1. A molding process with a control and plural molds for forming molded articles by transferring the plural molds in succession through a temperature elevation station, an injection molding station, a pressurized cooling station and a molded article removing station, comprising the steps of:

transferring each mold at a transfer speed between the temperatures elevating station, the injection molding station, the pressurized cooling station, and the removing station; and discriminating the transfer speed of each mold being transferred and determining a waiting time of the molds being transferred between the stations, wherein the transfer of each mold is controlled in the discriminating step.

2. A molding process with a control and plural molds for forming molded articles by transferring the plural molds in succession through a temperature elevating station, an injection molding station and a pressurized cooling station, comprising the steps of:

measuring the temperature elevating time of the mold at the temperature elevating station and producing a measurement signal;

setting a temperature elevating time predetermined for the article to be molded and producing a timing signal;

comparing the measurement signal with the timing signal; and transferring each mold at a transfer speed between the temperature elevating station, the injection molding station and the pressurized cooling station, wherein a waiting time during transfer or the transfer speed is controlled based upon the result in the comparing step.

3. A molding process with a control and plural molds for forming molded articles by transferring the plural molds in succession through a temperature elevation station, an injection molding station and a pressurized cooling station, comprising the steps of:

measuring the temperature of the mold after it is transferred from the temperature elevating station to the injection molding station and producing a temperature signal;

setting a temperature elevating time predetermined for the mold being transferred from the temperature elevating station to the injection molding station and producing a timing signal;

evaluating the temperature signal and the timing signal; and transferring each mold at a transfer speed between the temperature elevating station, the injection molding station and the pressurized cooling station, wherein a waiting time during transfer or the transfer speed is controlled based upon the result of the evaluating step.

4. A molding process with a control and plural molds for forming molded articles by transferring the plural molds in succession through a temperature elevation station, an injection molding station, a pressurized cooling station utilizing plural cooling units, and a molded article removing station comprising the steps of:

transferring the mold from one of the cooling units to the removing station at a transfer speed by a traverser;

measuring the cooling time of the mold at the pressurized cooling station and producing a cooling time signal;

setting a predetermined cooling time for the mold at the pressurized cooling station and producing a predetermined cooling time signal;

comparing the cooling time signal with the predetermined cooling time signal; and controlling the transfer speed and waiting time of the traverser to transfer the mold based on the results of the comparing step.

5. A molding process with a control and plural molds for forming molded articles by transferring plural molds in succession through a temperature elevating station, an injection molding station, and a pressurized cooling station utilizing plural cooling units, comprising the steps of:
transferring the mold a first time from the injection molding station to a predetermined position at the pressurized cooling station;
transferring the mold a second time from the predetermined position to one of the cooling units at the pressurized cooling station at a transfer speed by a traverser;
detecting the presence or absence of the mold at the predetermined position and in the traverser and outputting a signal; and
controlling the transfer speed and waiting time of the traverser to transfer the mold the second time based on the signal obtained in the detecting step.

6. A molding process with a control and a plurality of molds for forming molded articles by transferring the molds in succession through a temperature elevating station, an injection molding station, a pressurized cooling station and a molded article removing station, comprising the steps of:
transferring each mold from the injection molding station to the pressurized cooling station by a first conveyer;
transferring the mold from the pressurized cooling station to the molded article removing station by a second conveyer;
detecting the presence of the mold on the first and second conveyers; and
controlling the transferring by the first and second conveyers based on the detection made in the detecting step.

7. A molding process with a control and a plurality of molds for forming molded articles by transferring the plural molds in succession through a temperature elevating station, an injection molding station, and a cooling station, comprising the steps of:
disposing the molds in a plurality of cooling units for cooling the molds;
injecting resin into the molds disposed in the cooling units,
measuring the temperature and the cooling time of each mold in the cooling units; and
selecting a specific mold from the plurality of molds disposed in the cooling unit on the basis of the data obtained in the measuring step.

8. A molding process according to claim 7, further comprising the steps of:
removing the molds from the plurality of cooling units;
transferring the molds from the cooling station to a mold removing station, and
removing the molded articles from the molds, wherein the mold is transferred from the cooling station to the mold removing station on the basis of data obtained in the measuring step.

9. A molding process with a control and a plurality of molds for forming molded articles by transferring molds in succession through a temperature elevating station, an injection molding station, a pressurized cooling station and a molded article removing station, comprising the steps of:
disposing a mold in cooling units;
injecting resin into the mold disposed in the cooling units;
removing the mold from the cooling unit and moving it to a waiting position at the pressurized cooling station; and
transferring the mold from the pressurized cooling station to the molded article removing station.

10. A process according to claim 9, further comprising the step of calculating the waiting time of the mold at the waiting position.

11. A process according to claim 10, further comprising the step of replacing the mold at the cooling station with a mold injected with resin after the calculating step.

12. A process according to claim 9, further comprising the step of measuring the cooling time of each mold at the cooling station and comparing the measured time with a preset cooling time, and adjusting a transferring speed of the mold from the cooling station to the molded article removing station on the basis of the data from the comparing step.

13. A molding apparatus with a controller and a plurality of molds for feeding plural molds to an injection molding station, transferring the molds from the injection molding station after injection molding there to a pressurized cooling station provided with plural cooling units, and transferring the molds cooled in the cooling units to a molded article removing station, comprising:
means for supplying each cooling unit with cooling medium;
means for detecting the temperature of the mold set in each of the cooling units and producing a temperature signal;
means for measuring the cooling time of the mold set in each of the cooling units and producing a cooling time signal;
means for memorizing predetermined cooling times and temperatures for the mold and producing predetermined cooling time and temperature signal;
control means for changing the cooling temperature of the cooling medium; and
means for comparing the temperature and cooling time signals of the mold in each of the cooling units with the predetermined cooling time and temperature signals, wherein the temperature of the cooling medium in each mold is changed based on the result of said comparing means.

14. A molding apparatus with a control and a plurality of molds for feeding plural molds to an injection molding unit for resin injection molding, and transferring the molds in succession to a pressurized cooling unit provided with plural cooling units and a molded article removing unit, comprising:
means for detecting the cooling temperature of each of the cooling units and producing a first signal;
means for measuring the cooling time of the mold set in each of the cooling units and producing a second signal;
memory means for memorizing a cooling curve indicating a temperature corresponding to the cooling time matching the article to be injection molded;
discharge control means for discharging the molds from the cooling units, said discharge control means receiving the information from said memory means and the first and second signals and generating discharge signals for discharging the already cooled molds from the cooling units; and traverse means for transferring the molds from the pressurized cooling unit, said traverse means comprising traverse control means for controlling a traverser for transferring the molds, wherein said traverse control means moves said traverser to the position of a cooling unit containing an already cooled mold in response to the discharge signal from said discharge control means.

15. An injection molding apparatus, comprising:

a plurality of molds each having a molding cavity;

a molding unit for charging each said mold, injecting molten resin into the cavity, and discharging said mold containing the resin;

means for cooling each said mold, said cooling means including means for charging said mold transferred from said molding unit, means for pressurizing said mold, and plural cooling units for cooling said pressurized mold;

means for removing the molded article from said mold transferred from said cooling means; and mold transfer means for controlling the transfer time from said molding unit to each of said cooling units according to the distance from said molding unit to each of said cooling units.

16. An injection molding apparatus according to claim 15, wherein said molds comprise a movable portion and a fixed portion, and said pressurizing means comprises a first compression rod for driving said movable portion, wherein said compression rod is pressed to compress the resin in the cavity.

17. An injection molding apparatus according to claim 16, wherein said pressurizing means comprises a temperature control plate, said temperature control plate supporting a second compression rod and being maintained in a floating state by floating means.

18. An injection molding apparatus according to claim 15, further comprising means for heating said mold to a predetermined temperature prior to charging said molding unit.

19. An injection molding apparatus, comprising:

a plurality of molds each having a molding cavity;

a molding unit for loading said mold, injecting molten resin into the cavity, and discharging said mold containing the resin;

means for cooling said mold, said cooling means including means for charging said mold transferred from said molding unit, means for pressurizing said mold, and plural cooling units for cooling said pressurized mold;

means for removing the molded article from said mold transferred from said cooling means; and mold transfer means for controlling the transfer time from each of said cooling units to said removing means according to the distance from each of said cooling units to said removing means.

* * * * *

UNITED STATES PATENT AND TRADEMARK OFFICE
CERTIFICATE OF CORRECTION

PATENT NO. : 5,075,051   Page 1 of 6

DATED : December 24, 1991

INVENTOR(S) : Kazuhiko Ito, et al.

It is certified that error appears in the above-identified patent and that said Letters Patent is hereby corrected as shown below:

On the title page:

[73] ASSIGNEE:

"Cannon Kabushiki Kaisha," should read --Canon Kabushiki Kaisha,--.

[30] FOREIGN APPLICATION PRIORITY DATA:

Insert: --Jul. 14, 1989 [JP] Japan .......... 1-171105-- and "Japan .......... 63-99858[U]g34" should read --Japan .......... 63-99858[U]--.

[56] REFERENCES CITED:

FOREIGN PATENT DOCUMENTS, "59-83607  5/1584  Japan" should read --59-83607  5/1984  Japan--.

SHEET 2:

Figure 2, "PREES1" should read --PRESS 1--.

SHEET 3:

Fig. 3A-1

"$V_{BP} = \dfrac{Lx}{T_{BP} - T_h - T_i}$" should read

UNITED STATES PATENT AND TRADEMARK OFFICE
CERTIFICATE OF CORRECTION

PATENT NO. : 5,075,051
DATED : December 24, 1991
INVENTOR(S) : Kazuhiko Ito, et al.

It is certified that error appears in the above-identified patent and that said Letters Patent is hereby corrected as shown below:

$$-\!-V_{SP} = \frac{Lx}{T_{SP} - T_h - T_i}-\!-$$

SHEET 6:

Figure 4A, "HEATIG" should read --HEATING--.

COLUMN 3:

Line 39, "state" should read --step--.

COLUMN 4:

Line 11, "result" should read --result of the--.

COLUMN 5:

Line 63, "Fig. 3a-1" should read --Fig. 3A-1--.

COLUMN 7:

Line 15, "a" should read --1--.

COLUMN 8:

Line 23, "point 18" should read --point 13--.

UNITED STATES PATENT AND TRADEMARK OFFICE
CERTIFICATE OF CORRECTION

PATENT NO. : 5,075,051
DATED : December 24, 1991
INVENTOR(S) : Kazuhiko Ito, et al.

It is certified that error appears in the above-identified patent and that said Letters Patent is hereby corrected as shown below:

Line 44, "does" should read --dies--.

COLUMN 11:

Line 43, "(sall)." should read --(Sa11).--.
Line 44, "units 8" should read --units 18--.

COLUMN 12:

Line 9, "(Tb10)." should read --(Sb10).--.

COLUMN 14:

Line 26, "B1)" should read --B11)--.

Figure 7B:
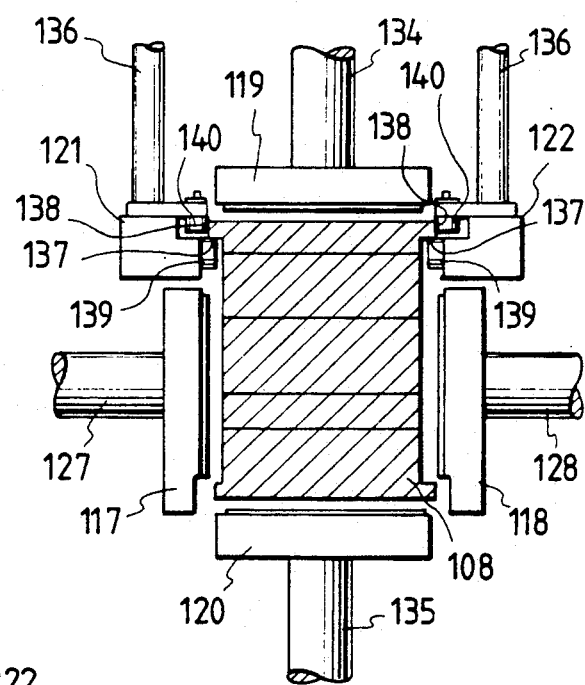
Figure 7C:
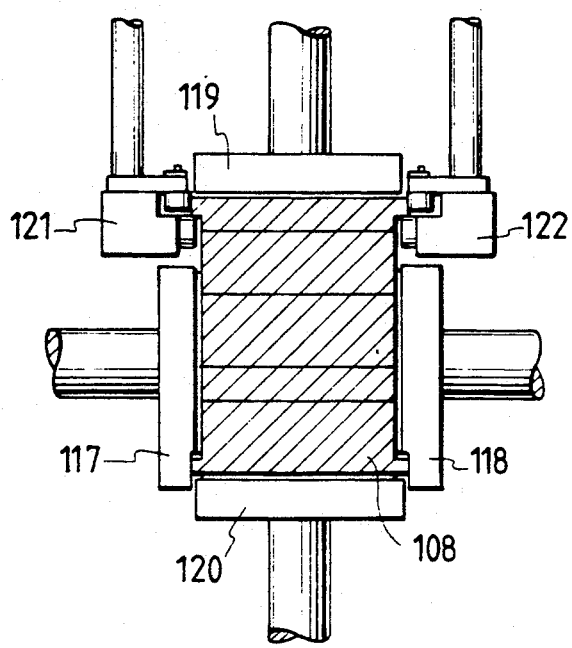

COLUMN 19:

Line 18, "Figs. 78 and C)," should read --Figs. 7B and C),--.
Line 30, "Figs. 78 and C)," should read --Figs. 7B and C),--.
Line 49, "Instruments 104" should read --Instruments 140--.

Figure 12:
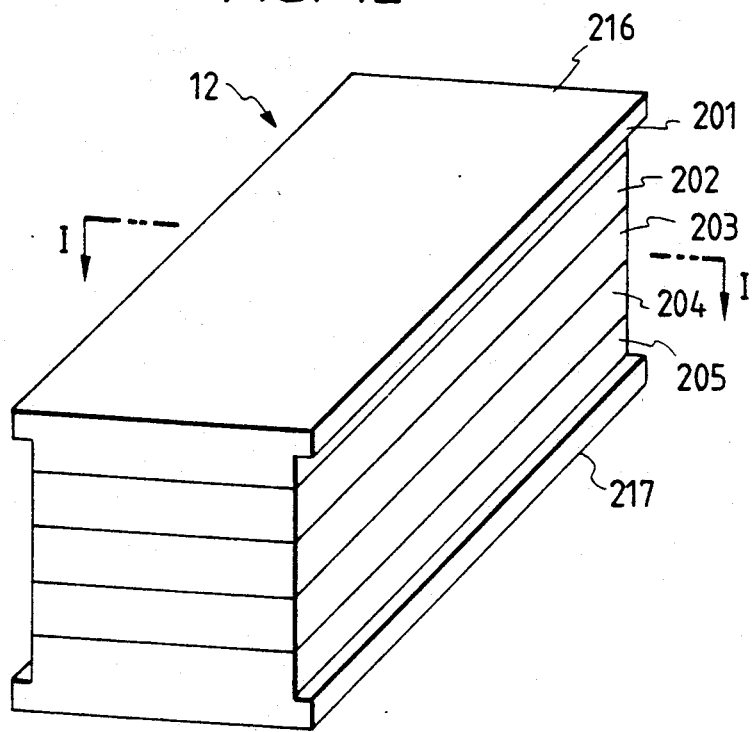
FIG. 12 is an external view of a mold employed in the embodiment shown in FIG. 10.

COLUMN 22:

Line 50, "means structure" should read --means
¶ Figs. 10 to 12 illustrate the detailed structure--.

UNITED STATES PATENT AND TRADEMARK OFFICE
CERTIFICATE OF CORRECTION

PATENT NO. : 5,075,051

DATED : December 24, 1991

INVENTOR(S) : Kazuhiko Ito, et al.

It is certified that error appears in the above-identified patent and that said Letters Patent is hereby corrected as shown below:

COLUMN 23:

Line 1, "plate 102." should read --plate 202.--.
    Line 50, "plate 105" should read --plate 205--.

COLUMN 24:

Line 58, "piece 9" should read --piece 209--.

COLUMN 25:

Line 62, "holes 235c" should read --holes 232c--.
    Line 63, "member 23," should read --member 232,--.

COLUMN 26:

Line 10, "comes" should read --becomes--.
    Line 14, "if" should be deleted.
    Line 17, "cavity 11" should read --cavity 211--.

COLUMN 27:

Line 42, "lates" should read --plates--.
    Line 44, "rods 109" should read --rods 309--.
    Line 48, "rods 109" should read --rods 309--.

UNITED STATES PATENT AND TRADEMARK OFFICE
CERTIFICATE OF CORRECTION

PATENT NO. : 5,075,051

DATED : December 24, 1991

INVENTOR(S) : Kazuhiko Ito, et al.

It is certified that error appears in the above-identified patent and that said Letters Patent is hereby corrected as shown below:

COLUMN 28:

Line 1, "rods 109," should read --rods 309,--.
Line 7, "plates 104," should read --plates 101,--.
Line 15, "rods 209," should read --rods 309,--.
Line 56, "piece 106" should read --piece 306--.
Line 62, "piece 107" should read --piece 307--.
Line 65, "elevation" should read --elevating--.

COLUMN 30:

Line 2, "temperatures" should read --temperature-- and
     "station." should read --station,--
Line 32, "elevation" should read --elevating--.
Line 53, "elevation" should read --elevating--.
Line 56, "station" should read --station,--.

COLUMN 31:

Line 18, "and" (first occurrence) should be deleted.
Line 49, "units," should read --units;--.
Line 60, "station," should read --station;--.

UNITED STATES PATENT AND TRADEMARK OFFICE
CERTIFICATE OF CORRECTION

PATENT NO. : 5,075,051

DATED : December 24, 1991

INVENTOR(S) : Kazuhiko Ito, et al.

It is certified that error appears in the above-identified patent and that said Letters Patent is hereby corrected as shown below:

COLUMN 32:

Line 28, "there" should read --therein--.
Line 43, "signal;" should read --signals--;

Signed and Sealed this

Twenty-fifth Day of August, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,075,051

DATED : December 24, 1991

INVENTOR(S) : Kazuhiko Ito, et al.

It is certified that error appears in the above-identified patent and that said Letters Patent is hereby corrected as shown below:

ON THE TITLE PAGE

[75] INVENTORS:

"Fumio Korayashi" should read --Fumio Kobayashi--.

Signed and Sealed this

Twenty-ninth Day of June, 1993

Attest:

MICHAEL K. KIRK

Attesting Officer

Acting Commissioner of Patents and Trademarks